US010594349B2

(12) United States Patent
Thakkar et al.

(10) Patent No.: US 10,594,349 B2
(45) Date of Patent: *Mar. 17, 2020

(54) ENHANCED MODEM BASED CARRIER AUTO-SELECTION ALGORITHM

(71) Applicant: QUALCOMM Incorporated, San Diego, CA (US)

(72) Inventors: Samir Thakkar, San Diego, CA (US); Caoye Shen, San Diego, CA (US); Adrian Sandstrom, San Diego, CA (US); Venkateshwarlu Vallala, Hyderabad (IN); Nagaraja Kumar Maganti, Hyderabad (IN); Devendra Bhangale, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,499

(22) Filed: Apr. 3, 2019

(65) Prior Publication Data

US 2019/0229761 A1 Jul. 25, 2019

Related U.S. Application Data

(63) Continuation of application No. 15/948,395, filed on Apr. 9, 2018, now Pat. No. 10,284,245.

(30) Foreign Application Priority Data

Jul. 28, 2017 (IN) .............................. 201741026869

(51) Int. Cl.
*H04B 1/38* (2015.01)
*H04B 1/3816* (2015.01)
(Continued)

(52) U.S. Cl.
CPC .......... *H04B 1/3816* (2013.01); *H04W 8/183* (2013.01); *H04W 8/20* (2013.01); *H04W 48/18* (2013.01); *H04W 88/06* (2013.01)

(58) Field of Classification Search
CPC ...... H04B 1/3816; H04W 8/183; H04W 8/20; H04W 88/06
(Continued)

(56) References Cited

U.S. PATENT DOCUMENTS 7,920,899 B2 * 4/2011 Jain ........................ H04W 8/205
455/432.2
8,301,196 B2 * 10/2012 Kauffman ............ H04B 1/3822
340/949

(Continued)

*Primary Examiner* — April G Gonzales
(74) *Attorney, Agent, or Firm* — Arent Fox LLP

(57) ABSTRACT

Aspects of the present disclosure includes a method of performing enhanced auto-selection in a UE including initiating the UE having at least a first subscriber identify module (SIM) card and a second SIM card, obtaining a current ICCID associated with the first SIM card, obtaining, from a cache of the UE, a previous ICCID used in a previous connection to a previously identified carrier, determining whether the current ICCID matches the previous ICCID, in response to determining that the current ICCID does not match the previous ICCID, creating a new card information using data stored in the first SIM card, obtaining one or more selection policies, identifying a carrier based on the one or more selection policies, and connecting to the identified carrier using data stored in the second SIM card associated with the identified carrier.

27 Claims, 28 Drawing Sheets

(51) Int. Cl.
*H04W 8/20* (2009.01)
*H04W 8/18* (2009.01)
*H04W 88/06* (2009.01)
*H04W 48/18* (2009.01)

(58) Field of Classification Search
USPC .......................................................... 455/558
See application file for complete search history.

(56) References Cited

U.S. PATENT DOCUMENTS

| | | | | |
|---|---|---|---|---|
| 9,491,048 | B2* | 11/2016 | Thakkar | H04W 8/183 |
| 2010/0311402 | A1* | 12/2010 | Srinivasan | H04W 8/183 |
| | | | | 455/418 |
| 2011/0195700 | A1* | 8/2011 | Kukuchka | H04W 8/18 |
| | | | | 455/422.1 |
| 2012/0108204 | A1* | 5/2012 | Schell | H04W 8/205 |
| | | | | 455/411 |
| 2012/0231844 | A1* | 9/2012 | Coppinger | G06Q 20/3229 |
| | | | | 455/558 |
| 2012/0309344 | A1* | 12/2012 | Ferrazzini | H04M 1/72519 |
| | | | | 455/406 |
| 2014/0293886 | A1* | 10/2014 | Thakkar | H04W 8/183 |
| | | | | 370/329 |
| 2015/0280787 | A1 | 10/2015 | Lerch et al. | |
| 2019/0036562 | A1 | 1/2019 | Thakkar et al. | |

* cited by examiner

| Structure | Field Sz | Field Name | FeatureTag Example | Comment |
|---|---|---|---|---|
| Header | uint32 | item_length; | 0x00001234 | length of FeatureTag entry (incl. header length) |
| Header | uint8 | item_type; | 0x07 | 0x07 = FeatureTag type |
| Header | uint8 | attrib; | 0x00 | Dummy attributes field: not needed for feature tags |
| Header | uint8 | sp_ops; | 0x00 | |
| Header | uint8 | spare1; | 0x00 | |
| TLV 1 | uint8 | type | 0x00 | T: Feature Condition type - Mandatory TLV for each feature tag<br>if ≅ # ifdef = 0<br>endif ≅ # endif = 1<br>elif ≅ # elif = 2 |
| TLV 1 | uint16 | length | 1 | L: Feature Condition length |
| TLV 1 | uint8 | value | 1 | V: Feature Condition value |
| TLV 2 | uint8 | type | 0x01 | T: FeatureName type - Mandatory TLV for each feature tag e.g. "VOLTE", "AUTOMOTIVE", "COMMERCIAL" |
| TLV 2 | uint16 | length | 2 | L: FeatureName length |
| TLV 2 | uint16 | value | 0x0001 | V: FeatureName Value |
| TLV 3 | uint8 | type | 0x02 | T: Conditional expression – optional TLV e.g. "GERMANY" |
| TLV 3 | uint16 | length | 2 | L: Conditional length – variable length for string value |
| TLV 3 | len_val | value | 0x0001 | V: Conditional value - default = 1, expression parsed on target to Boolean T/F |
| | | | Blue item values are variable | |

ENHANCED MODEM BASED CARRIER AUTO-SELECTION ALGORITHM

CROSS-REFERENCE TO RELATED APPLICATION

The present application is a Continuation of U.S. patent application Ser. No. 15/948,395 filed on Apr. 9, 2018, titled "Enhanced Modem Based Carrier Auto-Selection Algorithm," which claims priority to Indian Patent Application No. 2017/41026869 filed on Jul. 28, 2017, titled "Enhanced Modem Based Carrier Auto-Selection Algorithm," the contents of which are incorporated by reference in their entirety.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of wireless communications systems include code-division multiple access (CDMA) systems, time-division multiple access (TDMA) systems, frequency-division multiple access (FDMA) systems and orthogonal frequency-division multiple access (OFDMA) systems.

Multiple types of wireless communication devices are adapted to utilize wireless communications systems. Wireless communication devices may be generally referred to as access terminals. In some instances, an access terminal's communications interface (e.g., cellular wireless modem card) is configured for operation with a specific cellular service provider. For example, access terminals may be adapted to employ a specific cellular technology, as well as carrier-specific technical settings to access a carrier's network.

The variety of technical settings used for communications interfaces complicates the manufacture and sale of access terminals. One solution is to manufacture and sell access terminals specifically configured for particular carriers. However, this approach creates inventory challenges as an inventory of access terminals are provisioned and stocked for each cellular carrier even though the only difference between the access terminals may be a small amount of cellular provisioning information stored on the communications interface. Since it is not possible to know in advance which carriers will attract more consumers, retailers maintain excess inventory. Alternatively, consumers may be instructed to visit a physical location (e.g., a cellular carrier's store) to have the communications interface activated (i.e., programmed with provisioning data). However, this extra operation is likely to generate consumer dissatisfaction. Both alternatives will also instruct the consumer to bring the access terminal into a physical location (e.g., a store) in order to switch to a new carrier.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate automated configuration of access terminal communications interfaces based on an identity of a carrier active in the access terminal.

According to at least one aspect of the disclosure, access terminals may include a communications interface, a storage medium including modem configuration data, and a subscription module including a carrier identity. A processing circuit may be coupled to the communications interface, the storage medium, and the subscription module. The processing circuit may be adapted to determine the carrier identity from the subscription module. The processing circuit may further be adapted to select, from the modem configuration data, a modem configuration associated with the carrier identity, and activate that modem configuration to configure the communications interface to operate with a carrier associated with the carrier identity.

Further aspects provide methods operational on access terminals and/or access terminals including means to perform such methods. One or more examples of such methods may include determining a carrier identity from a subscription module. A modem configuration associated with the carrier identity may be selected from modem configuration data stored on a storage medium. The selected modem configuration may then be activated to facilitate configuration of a communications interface to operate with a carrier associated with the first carrier identity.

Still further aspects include processor-readable storage mediums comprising programming executable by a processing circuit. According to one or more examples, such programming may be adapted for causing the processing circuit to determine a carrier identity from a subscription module. The programming may further be adapted for causing the processing circuit to select a modem configuration associated with the carrier identity from modem configuration data stored on a storage medium, and to activate the selected modem configuration to configure a communications interface to facilitate operations associated with the carrier identity.

Aspects of the present disclosure include a method of performing enhanced auto-selection in a user equipment (UE) including initiating the UE having at least a first subscriber identify module (SIM) card and a second SIM card, obtaining a current integrated circuit card identifier (ICCID) associated with the first SIM card, obtaining, from a cache of the UE, a previous ICCID used in a previous connection to a previously identified carrier, determining whether the current ICCID matches the previous ICCID so the UE is able to connect to the previously identified carrier, in response to determining that the current ICCID does not match the previous ICCID, initiating an auto-select process for the UE to connect to a carrier by creating a new card information using data stored in the first SIM card, obtaining one or more selection policies, identifying a carrier based on the one or more selection policies, and connecting to the identified carrier using data stored in the second SIM card associated with the identified carrier.

In an aspect, the present disclosure includes a UE for performing enhanced auto-selection having a memory storing instructions, a transceiver, and a processor, coupled to the memory and the transceiver, configured to execute the instructions to: initiate the UE having at least a first SIM card and a second SIM card, obtain a current ICCID associated with the first SIM card, obtain, from the memory of the UE, a previous ICCID used in a previous connection to a previously identified carrier, determine whether the current ICCID matches the previous ICCID so the UE is able to connect to the previously identified carrier, in response to determining that the current ICCID does not match the previous ICCID, initiating an auto-selection process for the UE to connect to a carrier by create a new card information using data stored in the first SIM card, obtain one or more selection policies, identify a carrier based on the one or more selection policies, and connect, via the transceiver, to the identified carrier using data stored in the second SIM card associated with the identified carrier.

In other aspects, the present disclosure includes a computer readable medium having instructions stored therein, wherein the instructions, when executed by one or more processors, cause the one or more processors to initiate the UE having at least a first SIM card and a second SIM card, obtain a current ICCID associated with the first SIM card, obtain a previous ICCID used in a previous connection to a previously identified carrier, determine whether the current ICCID matches the previous ICCID so the UE is able to connect to the previously identified carrier, in response to determining that the current ICCID does not match the previous ICCID, initiating an auto-selection process for the UE to connect to a carrier by create a new card information using data stored in the first SIM card, obtain one or more selection policies, identify a carrier based on the one or more selection policies, and connect, via the transceiver, to the identified carrier using data stored in the second SIM card associated with the identified carrier.

In some aspects, the present disclosure includes method for accessing a modem configuration binary (MBN) parsing a stack of the MBN into a base section, a type-length value (TLV) section, and one or more logically separate sections, wherein the base section and the TLV section include configuration information common to the one or more logically separate sections, assigning one or more feature tags to each of the one or more logically separate sections, wherein each of the one or more feature tags contains information relating to one of a geography, industry, or technology, and selecting a carrier by applying configuration information from the base section and the TLV section, and the information in at least one of the one or more feature tags.

Other aspects, features, and embodiments of the present method and apparatus will become apparent to those of ordinary skill in the art, upon reviewing the following description of specific, exemplary embodiments of the present method and apparatus in conjunction with the accompanying figures. While features of the present method and apparatus may be discussed relative to certain embodiments and figures below, all embodiments of the present method and apparatus can include one or more of the advantageous features discussed herein. In other words, while one or more embodiments may be discussed as having certain advantageous features, one or more of such features may also be used in accordance with the various embodiments of the method and apparatus discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 13 is an example feature tag structure with MBN entries.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below for one or more specific protocols and systems, and related terminology may be found in much of the following description. However, those of ordinary skill in the art will recognize that one or more aspects of the present disclosure may be employed and included in one or more other wireless communication protocols and systems.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

Figure 1:
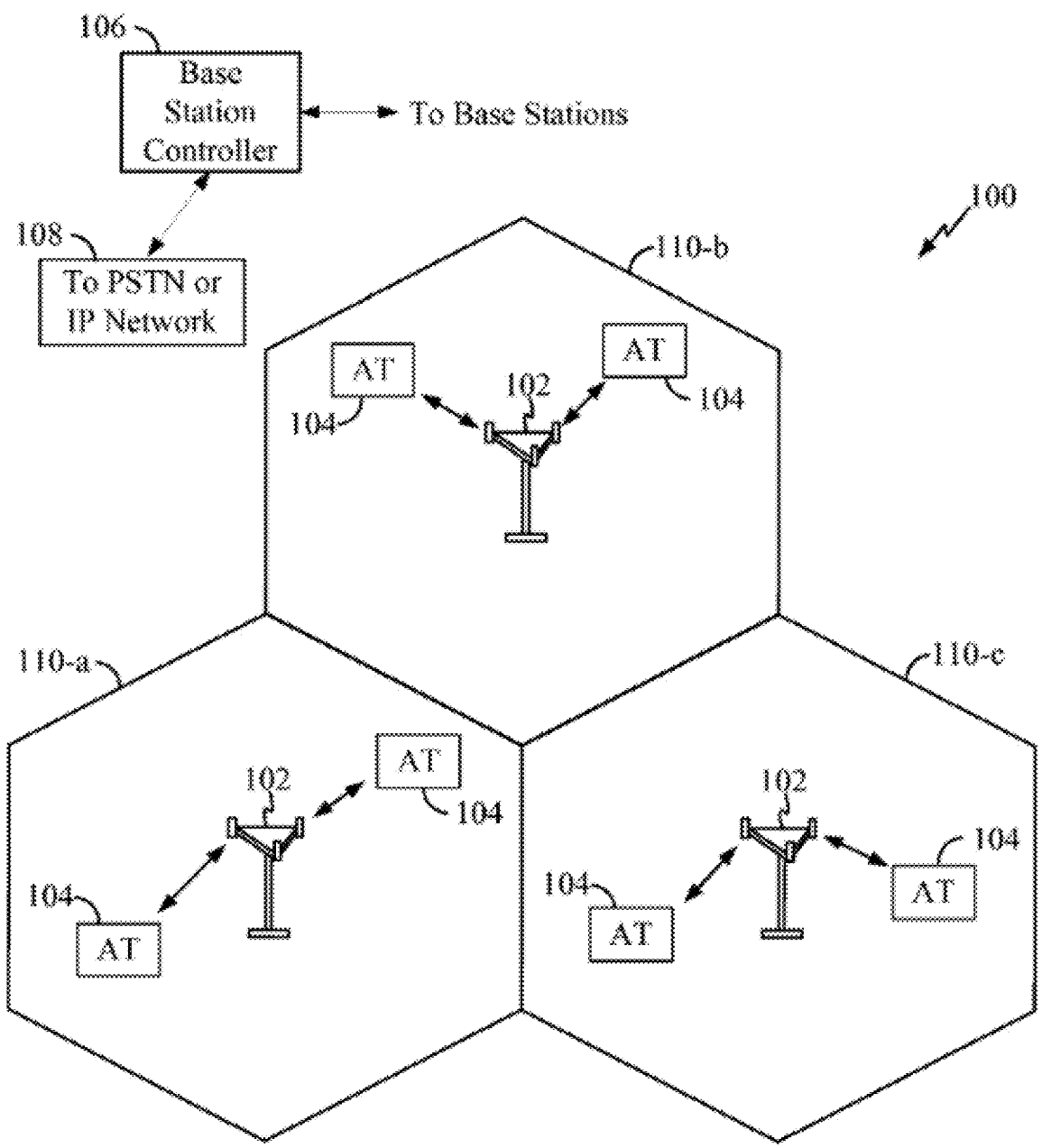
FIG. 1 is a block diagram of a network environment in which one or more aspects or embodiments of the present disclosure may find application.

Referring now to FIG. 1, a block diagram of a network environment in which one or more aspects of the present disclosure may find application is illustrated. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106. Each of the base stations 102 can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). In various examples, the system 100 may include base stations 102 of different types.

One or more access terminals 104 may be dispersed throughout the coverage areas 110. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, an automobile, an entertainment device, display board, display screen, and/or other communication/computing device which communicates, at least partially, through a wireless or cellular network.

To actively communicate within the wireless communications system 100, each access terminal 104 is typically provisioned for a specific carrier. That is, a communications interface for each access terminal 104 is typically configured to operate with a specific carrier. A carrier, which may also be referred to as a wireless service provider, refers to an entity that typically receives payments from subscribers for wireless voice and data communication services. In some instances, a user may have a separate service that uses the same infrastructure and base stations deployed by the carriers. For example, when an access terminal is employed in an automobile, an automotive service provider may offer to provide in-vehicle subscription services, such as for example, voice communication and calling, navigation, security, and diagnostics. Typically, a subscriber pays the automotive service provider, but the automotive service provider relies on the same infrastructure and base stations deployed by local carriers.

Often, an access terminal manufacturer produces access terminals 104 to include all the necessary circuitry, software, and configurations to connect to the wireless communications system 100 for a specific carrier with minimal or no manual interaction by a user. For instance, a manufacturer may desire to employ a communications interface adapted to connect with a particular carrier "out-of-the-box."

Most carriers employ closed systems, in which access to their network is regulated by tightly controlled provisioning data, and most access terminals 104 are programmed for use with a particular carrier before it can operate within the communications system 100. That is, a communications interface in an access terminal 104 typically are provisioned (or configured) with special data that is unique to a particular cellular system carrier before it can operate in the communications system 100 with that carrier.

The provisioning information, which may also be referred to herein as a modem configuration, that is typically implemented by a communications interface of an access terminal 104 includes various data. This data can include information employed by the communications interface to access the network, identifiers to be transmitted by the communications interface to the network, and information to enable the communications interface to connect to cellular networks no matter where they are located. In some scenarios, the communications interface may be informed of the frequencies and access codes for connecting to a particular carrier's network. The communications interface may also be programmed with identification codes that will be transmitted to the carrier's network so that the carrier will recognize the access terminal 104 as authorized to access the network.

In addition to subscription related data, provisioning information (modem configuration) may also include feature flags and definitions that activate features and applications on the access terminal 104 by setting particular variables to specific values. For example, one carrier may choose to support a particular optional feature in a 3G or 4G standard (or other standards), and does so by setting associated flags and data values in the provisioning. A second carrier that chooses not to support that optional feature would include in its provisioning data a different set of flags and data associated with this feature. Furthermore, each carrier may employ different revisions of wireless standards being deployed on their network.

Provisioning information is typically stored in nonvolatile (NV) memory accessible by the communications interface. This ensures that the essential provisioning information is available to the communications interface for connecting to one or more networks. As such, provisioning information may be said to contain a variety of NV (or configuration) items. Each NV item may contain a value or array of data. Each NV item may be utilized by the carrier to perform a function or feature set.

In addition to a carrier's unique provisioning information, cellular networks employ different technologies including, for example, Code Division Multiple Access and the Universal Mobile Telecommunications Service (UMTS) technologies. While a single communications interface of an access terminal 104 can be designed with circuitry enabling it to connect to either a CDMA or UMTS technology network, these different technologies may employ different modem configurations even when the same carrier is supporting both network technologies.

Without proper modem configuration, an access terminal 104 cannot access the carrier's network, and thus may not be able to access the cellular network "out-of-the-box." Furthermore, once an access terminal 104 is provisioned for a particular carrier, it may be relatively difficult to reconfigure the access terminal 104 for use with a different carrier.

For instance, if a mobile phone, laptop computer, tablet computer, automobile, or other such access terminal 104 is provisioned for use with a specific carrier, a user desiring to change carriers typically either replace the device itself, manually change the carrier provisioning, or take the device to a service provider's location where the device can be reprogrammed. Some access terminals 104, such as automobiles, are not typically replaced nearly as frequently as other access terminals, such as mobile phones. In the example of an automobile, when an automotive service provider wishes to switch carriers for its subscribers, because the hardware is frequently integrated into the automobile itself, the replacement of hardware to enable switching carriers is not practical. Thus, to switch carriers, the automobile is typically brought in to a dealer or auto shop, where the automobile may be serviced (e.g., by plugging in a USB or other hard-wired interface) to reconfigure the communications interface for the new carrier.

According to at least one aspect of the present disclosure, access terminals are adapted to switch to different modem configurations to operate with a particular carrier desired by the user. That is, aspects of the present disclosure provide for access terminals with a communications interface having multimode or multi-carrier capabilities, where selection of one modem configuration from a plurality of modem configurations may be automatically accomplished without the need for user interaction. In various examples, the access terminal is adapted to select the particular modem configuration based on a carrier identifier associated with the access terminal.

Figure 2:
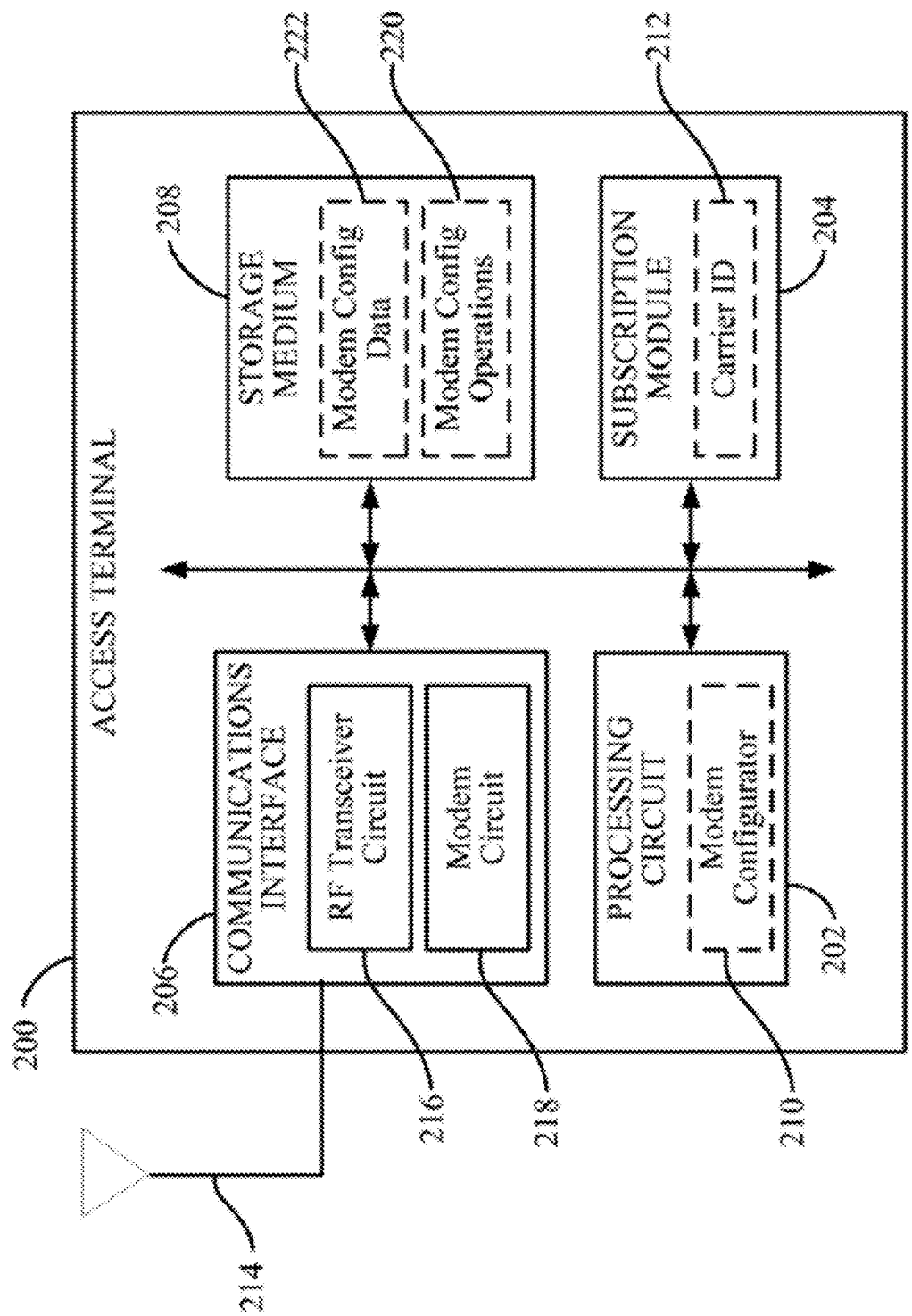
FIG. 2 is a block diagram illustrating select components of an access terminal according to some embodiments.

Turning to FIG. 2, a block diagram is shown illustrating select components of an access terminal 200 according to at least one example of the present disclosure. The access terminal 200 includes a processing circuit 202 coupled to or placed in electrical communication with a subscription module 204, a communications interface 206, and a storage medium 208. The access terminal 200 may be a UE, a smart phone, a mobile cellular phone, a tablet, or other digital communication devices.

The processing circuit 202 is arranged to obtain, process and/or send data, control data access and storage, issue commands, and control other desired operations. The processing circuit 202 may include circuitry adapted to implement desired programming provided by appropriate media in at least one example. For example, the processing circuit 202 may be implemented as one or more processors, one or more controllers, and/or other structure configured to execute executable programming. The processing circuit 202 may include more than one portion located within different circuits or modules of the access terminal 200. For example, a portion of the processing circuit 202 (e.g., a first processor) may be located within the communications interface, and another portion (e.g., a second processor) located in another portion of the access terminal 200. For simplicity, various portions of the processing circuit 202 are depicted as a single block in the present disclosure.

Examples of the processing circuit 202 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 202 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 202 are for illustration and other suitable configurations within the scope of the present disclosure are also contemplated.

The processing circuit 202 is adapted for processing, including the execution of programming, which may be stored on the storage medium 208. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 202 may include a modem configurator 210. The modem configurator 210 may include circuitry and/or programming (e.g., programming stored on the storage medium 208) adapted to determine a carrier identity, and to select and implement appropriate modem configurations for the communications interface 206 to facilitate wireless connectivity with the determined carrier.

The subscription module 204 may include a removable or fixed (e.g., embedded) module that includes various subscription details, including a carrier identifier (ID) 212. The subscription module 204 may be implemented as one or more of a Subscriber Identity Module, User Identity Module (UIM, R-UIM), Universal Integrated Circuit Card (UICC), CDMA Subscriber Identity Module (CSIM), Universal Subscriber Identity Module (USIM)), or other similar identity module including a carrier ID 212.

The carrier ID 212 is generally adapted to indicate the identity of a particular carrier associated with the subscription module 204. This is typically the carrier with which the access terminal 200 will be adapted to use for wireless communications. According to various examples, the carrier ID 212 may be an Issuer Identification Number (IIN), a Public Land Mobile Network (PLMN) ID, and/or an International Mobile Subscriber Identity (IMSI), as well as additional or alternative information in the subscription module 204 according to other examples of the present disclosure.

In at least one example, the subscription module 204 may be a UIM or R-UIM. This is a conventional module developed for 3GPP2 CDMA access terminals and which can additionally include capabilities for dual compatibility with 3GPP GSM networks. Among other information, a UIM includes a unique serial number called the Integrated Circuit Card Identifier. The structure of the ICCID is standardized by the International Telecommunications Union (ITU).

According to the standards, the first 4-7 digits of the ICCID contain a carrier ID 212 in the form of the IIN. The ICCID includes a 2-digit major industry identifier (always taking the value 89 for telecommunications), a 1-3-digit country code identifying the country in which the wireless service provider provides service, and the 1-4-digit IIN. The ITU maintains a list of registered IINs, maintained at http://www.itu.int/pub/T-SPOB.971-2011 (ITU Operational Bulletin No. 971). By way of an example, the ICCID used by Carrier X may be 89112300000012345678. This includes the industry identifier (89), the country code (1), and the IIN (123) assigned to Carrier X by the ITU. In this case, the IIN alone would be sufficient to identify Carrier X as the carrier.

In some examples, the carrier ID 212 may include a PLMN ID. The PLMN ID includes a mobile country code (MCC) and a mobile network code (MNC) that can be used to identify a carrier.

In some examples, the carrier ID 212 can include an IMSI associated with the subscription module 204. For instance, each carrier is often provided as a block or range of IMSIs to assign to subscribing customers. Accordingly, an IMSI that falls within a particular range may be identified as being associated with a particular carrier. By way of example, Carrier X may be provided IMSIs 123123000095000 through 123123000098999, while Carrier Y may be provided IMSIs 123123000099000 through 123123000126499. Thus, if the IMSI falls within the range associated with Carrier X, then the IMSI employed as the carrier ID 212 indicates that the carrier is Carrier X. On the other hand, if the IMSI falls within the range associated with Carrier Y, then the IMSI employed as the carrier ID 212 indicates that the carrier is Carrier Y The communications interface 206 is configured to facilitate wireless communications of the access terminal 200. For example, the communications interface 206 may include circuitry and/or programming adapted to facilitate the communication of information bi-directionally for a particular carrier. The communications interface 206 may be coupled to one or more antennas 214, and include wireless (RF) transceiver circuitry 216 and modem circuitry 218. The RF transceiver circuitry 216 includes circuitry for sending and receiving radio frequency signals to/from a carrier network. The modem circuitry 218 may be configured to encode digital data into radio frequency signals for transmission, and translate received radio frequency signals into digital data that can be interpreted by at least a portion of the processing circuit 202.

According to at least one aspect of the present disclosure, the communications interface 206 may be configurable to operate on any of a variety of carriers, for any of a variety of technologies. For instance, the access terminal 200 may employ a chipset or module which includes a processing circuit 202 with multiple processors in addition to signal generator and modem circuits. Such a configuration enables the communications interface 206 to be definable by software (e.g., software defined radio). Such a software defined radio based communications interface 206, generates, encodes/decodes, and modulates/demodulates data signals within a portion of the processing circuit 202 implemented as a programmable DSP. The programmable DSP enables communication signals to be defined by software to conform with the wave form, frequency and data packet requirements of any communication technology (e.g., GSM/UMTS, CDMA). By re-programming the DSP to generate signals with different characteristics, the communications interface 206 may be made to generate a communication signal that is compatible with any carrier's unique communications network. Thus, an access terminal 200 equipped with a software defined radio based communications interface 206 may subscribe to any carrier for communications support regardless of the communication technology used.

The storage medium 208 may represent one or more computer-readable, machine-readable, and/or processor readable devices for storing programming, such as processor executable code or instructions (e.g., software, firmware), electronic data, databases, or other digital information. The storage medium 208 may also be used for storing data that can be manipulated by the processing circuit 202 when executing programming. The storage medium 208 may be any available media that can be accessed by a general purpose or special purpose processor, including portable and/or fixed storage devices, optical storage devices, and/or various other mediums capable of storing, containing and/or carrying programming. By way of example and not limitation, the storage medium 208 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 208 may be coupled to the processing circuit 202 such that the processing circuit 202 can read information from, and write information to, the storage medium 208. That is, the storage medium 208 can be coupled to the processing circuit 202 so that the storage medium 208 is at least accessible by the processing circuit 202, including examples where the storage medium 208 is integral to the processing circuit 202 and/or examples where the storage medium 208 is separate from the processing circuit 202 (e.g., resident in the access terminal 200, external to the access terminal 200, distributed across multiple entities). Although the storage medium 208 is depicted as a single block, it should be understood that the storage medium 208 may include a plurality of separate storage mediums located in different physical locations and/or even coupled to different portions of the processing circuit 202. For example, a nonvolatile storage medium of the storage medium 208 may be associated with the communications interface, while one or more other storage mediums may be associated with other components and/or positioned in other distinct locations.

Programming stored by the storage medium 208, when executed by the processing circuit 202, causes the processing circuit 202 to perform one or more of the various functions and/or process operations described herein. For example, the storage medium 208 may include modem configuration operations 220 adapted to configure the communications interface 206 to operate according to a specific configuration associated with the carrier ID 212. For instance, the modem configuration operations 220 may cause the processing circuit 202 to identify the carrier ID 212, and to select a particular modem configuration from the modem configuration data 222 to cause the communications interface 206 (e.g., the modem circuit 218) to operate on the identified carrier, as described herein. Thus, according to one or more aspects of the present disclosure, the processing circuit 202 is adapted to perform (in conjunction with the storage medium 208) any or all of the processes, functions, operations and/or routines for any or all of the access terminals described herein. As used herein, the term "adapted" in relation to the processing circuit 202 may refer to the processing circuit 202 being one or more of configured, employed, implemented, and/or programmed (in conjunction with the storage medium 208) to perform a particular process, function, operation and/or routine according to various features described herein.

As illustrated in FIG. 2, the storage medium 208 further includes modem configuration data 222. The modem configuration data 222 includes data adapted to configure the communications interface 206 (e.g., the modem circuit 218) for operation with a specific carrier. According to an aspect of the present disclosure, a modem configuration may be automatically activated from the modem configuration data 222 by the processing circuit 202 executing the modem configuration operations 220 to enable communications with a different carrier network various examples of generating modem configuration data 222 and activating the proper modem configuration from the modem configuration data 222 are described in U.S. patent application Ser. No. 12/431,050 (U.S. Pat. No. 8,453,140) and Ser. No. 12/787,955 (U.S. Patent Application Publication No. 2011/0296399-A1), the disclosures of which are hereby incorporated by reference as if fully set forth herein in their entireties.

Figure 3:
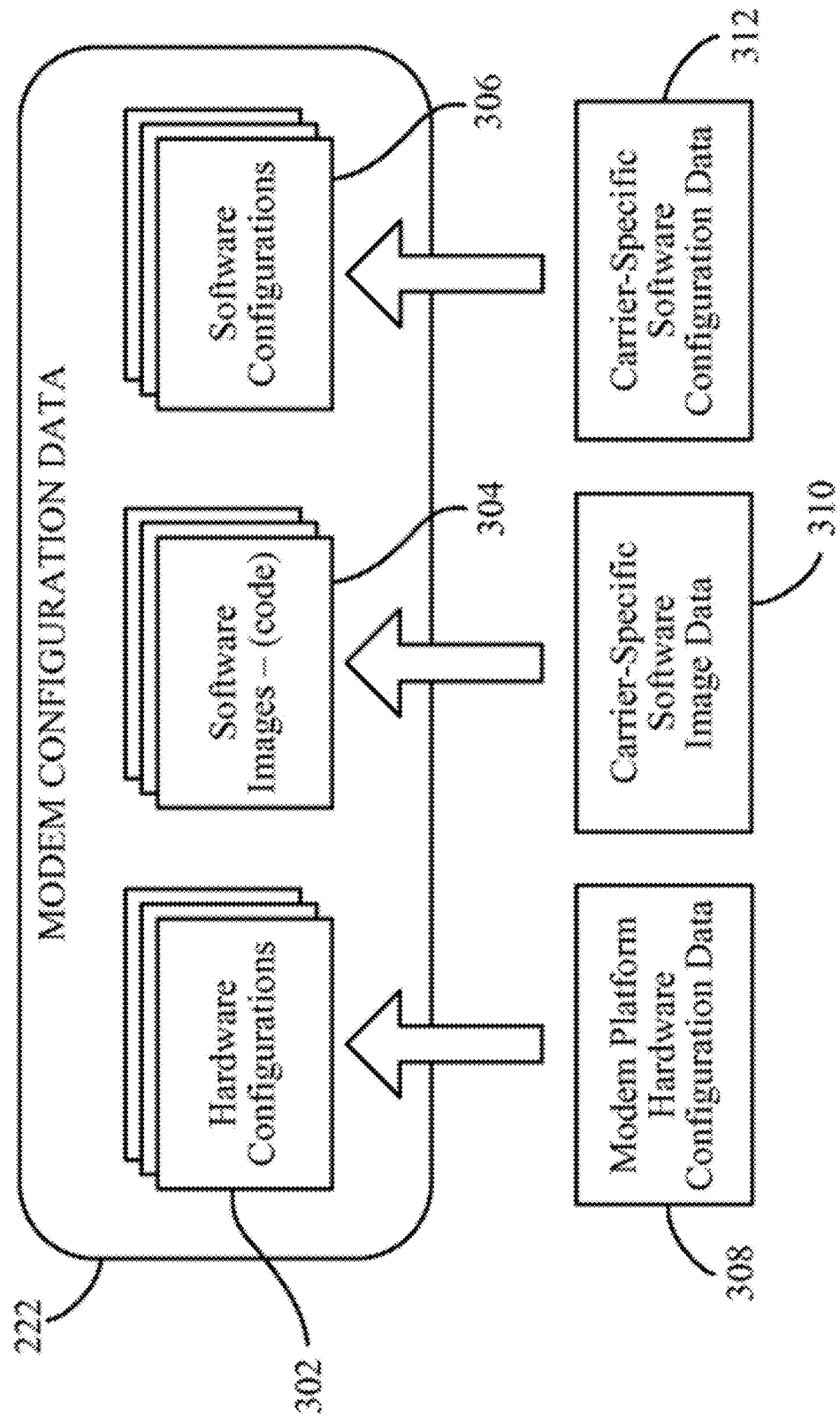
FIG. 3 is a block diagram illustrating select components of the modem configuration data of FIG. 2 according to some embodiments.

FIG. 3 is a block diagram illustrating select components of the modem configuration data 222 according to at least one example. In general, the modem configuration data 222 may include one or more hardware configurations 302, one or more software images 304, and/or one or more software configurations 306.

A hardware configuration 302 can be generally adapted to configure the communications interface 206 for a specific hardware implementation. In examples where the modem configuration data 222 includes a plurality of hardware configurations 302, the hardware configurations can be available to the access terminal 200 to enable the access terminal 200 to activate a particular hardware configuration 302 according to the specific hardware implemented by the access terminal 200. In some instances, the hardware configurations 302 can be modified as desired by updating one or more of the hardware configurations 302 and/or by loading additional hardware configurations 302. In some examples, the various hardware configurations 302 can be obtained from modem platform hardware configuration data 308. modem platform hardware configuration data 308 may include information stored in one or more locations of the storage medium 208 and/or loaded onto the access terminal 200 from another source. In one example, the modem platform hardware configuration data 308 may include a database of various configuration data stored on the storage medium 208. A database may be used to configure and/or generate the various hardware configurations 302. modem platform hardware configuration data 308 may include configuration data such as pin mappings, port mappings, power amplifier gain control settings, antenna tuning, etc. that can be implemented for respective hardware implementations.

A software image 304 may be generally adapted to configure the communications interface 206 for operation with a specific carrier. In examples where the modem configuration data 222 includes a plurality of software images 304, a particular software images 304 can be activated by the processing circuit 202 to facilitate operations with a particular carrier. Accordingly, the various software images 304 can also be referred to as carrier-specific software images 304. The plurality of carrier-specific software images 304 can be obtained from carrier-specific software image data 310. Carrier-specific software image data 310 may include information stored in one or more locations of the storage medium 208 and/or loadable to the storage medium 208.

A software configuration 306 can be generally adapted to configure the communications interface 206 for operation with a specific carrier. In examples where the modem configuration data 222 includes a plurality of software configurations 306, a particular software configuration 306 can be activated by the processing circuit 202 to facilitate operations with a particular carrier. Accordingly, the various software configurations 306 can also be referred to as carrier-specific software configurations 306. The plurality of carrier-specific software configurations 306 can be obtained from carrier-specific software configuration data 312. The carrier-specific software configuration data 312 may include information stored in one or more locations of the storage medium 208 and/or loadable to the storage medium 208.

By way of example only, a carrier-specific software image 304 and/or a carrier-specific software configuration 306 may include carrier-specific provisioning information, such as frequencies and access codes for enabling the communications interface 206 to connect to a particular carrier's network, as well as identification codes that will be transmitted to the carrier's network so that the carrier will recognize the access terminal 200 as authorized to access the network. In addition, each carrier-specific software image 304 and/or carrier-specific software configuration 306 may include feature flags and definitions that activate features and applications on the communications interface 206. The carrier-specific software images 304 may also include carrier-specific features and code that may be used by the associated carrier, in addition to the carrier-specific software configuration 306. In some instances, a carrier-specific software image 304 that is separate from the carrier-specific software configuration 306 may be beneficial because a Type Approval or certification may initially be done with a few carriers to begin with. As more carriers are enabled, there may be a need to support additional software images 304 with updated code for each carrier-specific functionality, since the earlier software image 304 may be frozen after the Type Approval. Additional and/or different information may also be included with each carrier-specific software image 304 and/or carrier-specific software configuration 306.

According to aspects of the present disclosure, the access terminal 200 is adapted to select a proper modem configuration from the modem configuration data 222 in response to the carrier identity 212. The proper modem configuration can further be activated with the communications interface 206 (e.g., the modem circuit 218) to enable the communications interface 206 to operate with the carrier associated with the carrier identity 212. A modem configuration, which may also be referred to as an carrier-specific modem configuration, includes a specific combination of modem configuration data 222 that is adapted for use with a specific carrier identity 212. For example, a modem configuration may include a specific hardware configuration 302, software image 304, and/or software configuration 306 of the modem configuration data 222 that can be activated with the communications interface 206 for operation with a carrier associated with the carrier identity 212. Accordingly, when a particular carrier identity 212 is acknowledged, the modem configuration associated with the identified carrier identity 212 can be selected and activated as the modem configuration data 222 for configuring the communications interface 206. As a result, the communications interface 206 (e.g., the modem circuit 218) can be properly configured to operate on the identified carrier's network.

Figure 4:
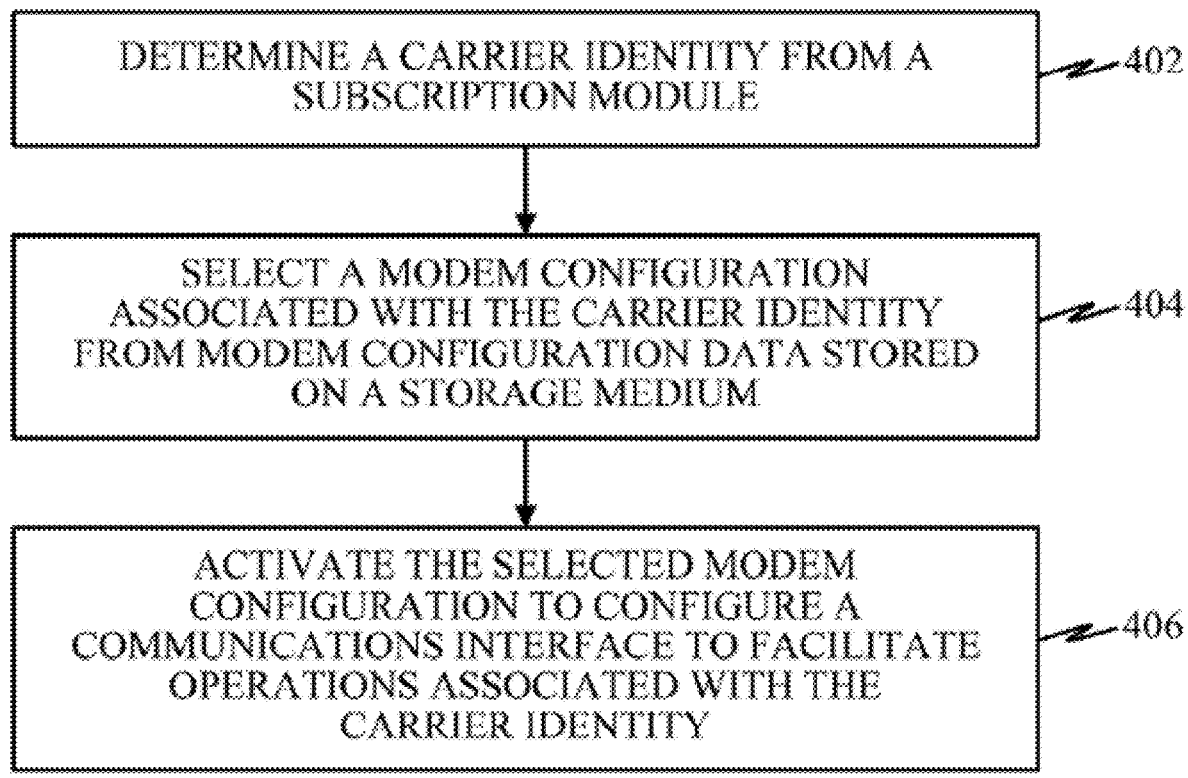
FIG. 4 is a flow diagram illustrating at least one example of a method operational on an access terminal, such as the access terminal, according to some embodiments.

FIG. 4 is a flow diagram illustrating at least one example of a method operational on an access terminal, such as the access terminal 200. Referring to FIGS. 2 and 4, an access terminal 200 can determine a carrier identity from a subscription module at block 402. For example, the processing circuit 202 (e.g., the modem configurator 210) executing the modem configuration operations 220 may determine the carrier identity 212 from the subscription module 204.

Figure 5:
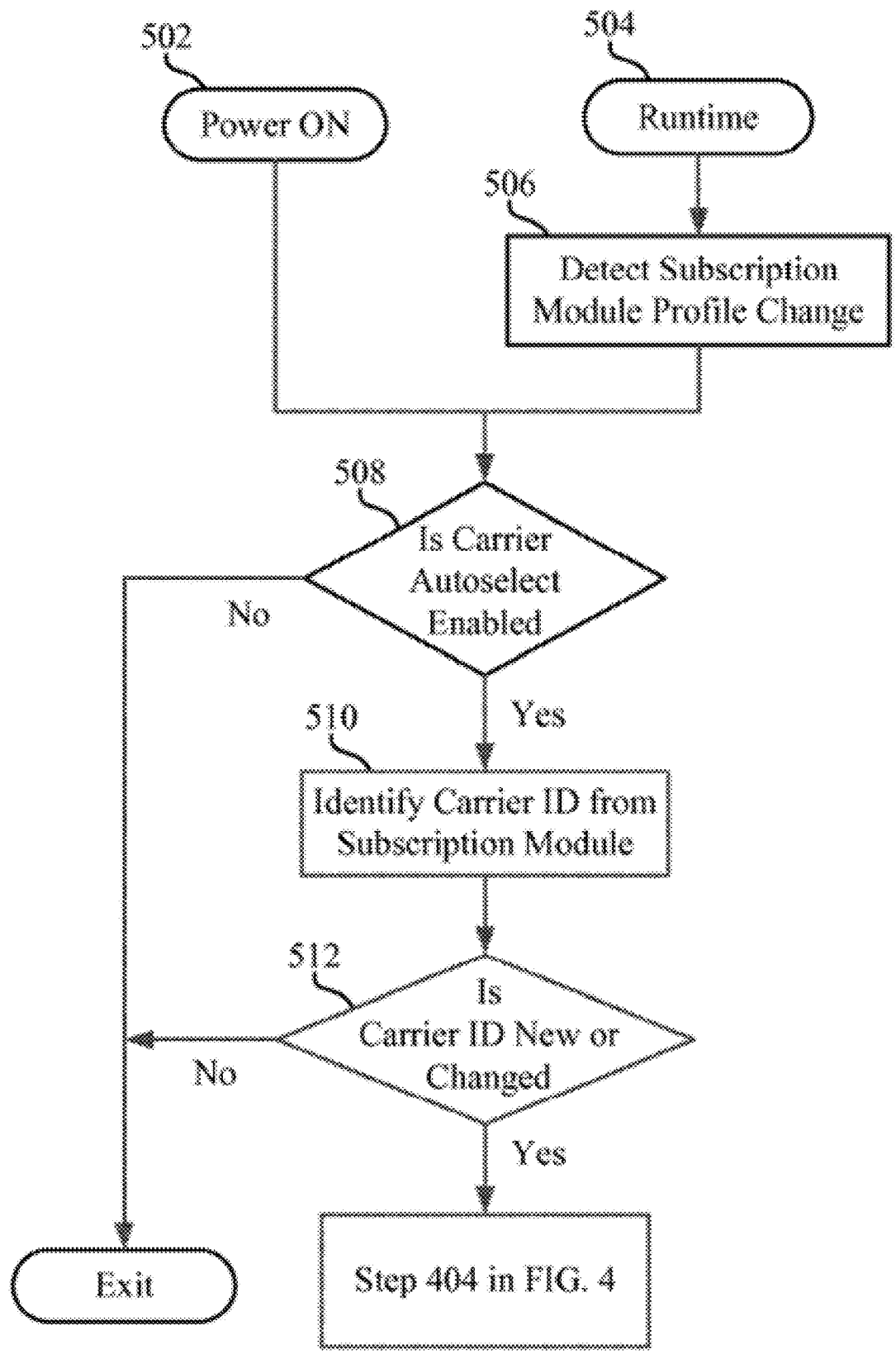
FIG. 5 is a flow diagram illustrating at least one example of an algorithm employable to determine the carrier identity from the subscription module according to some embodiments.

FIG. 5 is a flow diagram illustrating at least one example of an algorithm employed in the processing circuit 202 when executing the modem configuration operations 220 to determine the carrier identity 212 from the subscription module 204. As shown in FIG. 5, and with reference to components depicted in FIG. 2, at least two scenarios may result in the processing circuit 202 determining the carrier identity 212 from the subscription module 204. At block 502, when the access terminal 200 is powered ON after being powered OFF for a period of time, the access terminal 200 is adapted to determine whether there is a new or different carrier ID 212. A new or different carrier ID 212 may occur when, for example, a subscription module 204 is inserted into the access terminal 200, whether it be the first subscription module 204 to be used with the access terminal 200 or whether it be a subscription module 204 replacing a previous or another subscription module.

On the other hand, as shown at block 504, the processing circuit 202 may detect a change to a profile associated with the subscription module 204 while the access terminal 200 is actively performing runtime operations. For example, a user may remove a first subscription module 204 and insert a second, different subscription module 204 without first powering OFF the access terminal 200. In other examples, the profile for an embedded subscription module 204 may be reprogrammed, such as over the air interface or via a wired connection, while the access terminal 200 is powered ON, and a subscription module refresh including a reset of the communications interface 206 may be triggered.

In either case, whether the access terminal 200 is powered ON or has detected a change to the subscription module profile, the processing circuit 202 may determine whether the auto-selection features of the present disclosure are enabled for the particular access terminal 200, at block 508. According to an aspect of the present disclosure, the auto-selection features described herein can be enabled or disabled as desired. Accordingly, the processing circuit 202 may make a determination as to whether such features are enabled. If the features are not enabled, then the processing circuit 202 may exit the current algorithm shown in FIG. 5, and can also end the method of FIG. 4.

On the other hand, if the auto-selection features are enabled at block 508, the processing circuit 202 may identify the carrier ID 212 from the subscription module 204, at block 510.

In some examples, the carrier ID 212 may include an HN included in the subscription module 204. In such instances, the processing circuit 202 may access the ICCID information to obtain the IIN therefrom. The processing circuit 202 may further identify the identity of the carrier associated with the IIN from, for example, a listing of IINs and their associated carrier.

In some examples, the carrier ID 212 may include a MCC and a MNC from a PLMN ID. In such instances, the processing circuit 202 may access the PLMNID of the subscription module 204 to obtain the MCC and MNC therefrom. The processing circuit 202 may further identify the carrier associated with the MCC and MNC values. In some examples, the carrier ID 212 may include the IMSI. In such examples, the processing circuit 202 may access the IMSI of the subscription module 204 as well as ranges of IMSIs associated with the various carrier identities. The processing circuit 202 can then identify which carrier is associated with the range of IMSIs into which the IMSI of the subscription module 204 is located.

With the carrier ID 212 identified, the processing circuit 202 may determine at block 512 whether the carrier ID 212 is new or has changed at block 512. The carrier ID 212 may be considered new if the access terminal 200 has not yet had an active subscription module 204 employed. The carrier ID 212 may be considered to be a changed carrier ID 212 if the access terminal 200 has employed a previous carrier ID 212, and the current carrier ID 212 is different from the previous carrier ID 212.

If there is no change in the carrier ID 212, even if the profile of subscription module 204 has changed, then the processing circuit 202 may simply exit the algorithm of FIG. 5, as well as end the method of FIG. 4. If, however, the processing circuit 202 determines that the carrier ID 212 is new or has changed, then the processing circuit 202 can continue to block 404 in FIG. 4.

Referring again to FIGS. 2 and 4, the access terminal 200 may select a modem configuration associated with the carrier identity from the modem configuration data stored at the access terminal 200, at block 404. For example, the processing circuit 202 (e.g., the modem configurator 210) executing the modem configuration operations 220 may select the modem configuration associated with the carrier ID 212. In particular, the processing circuit 202 (e.g., the modem configurator 210) executing the modem configuration operations 220 may select a software image 304 and/or a software configuration 306 (see FIG. 3) associated with the carrier ID 212.

Figure 6:
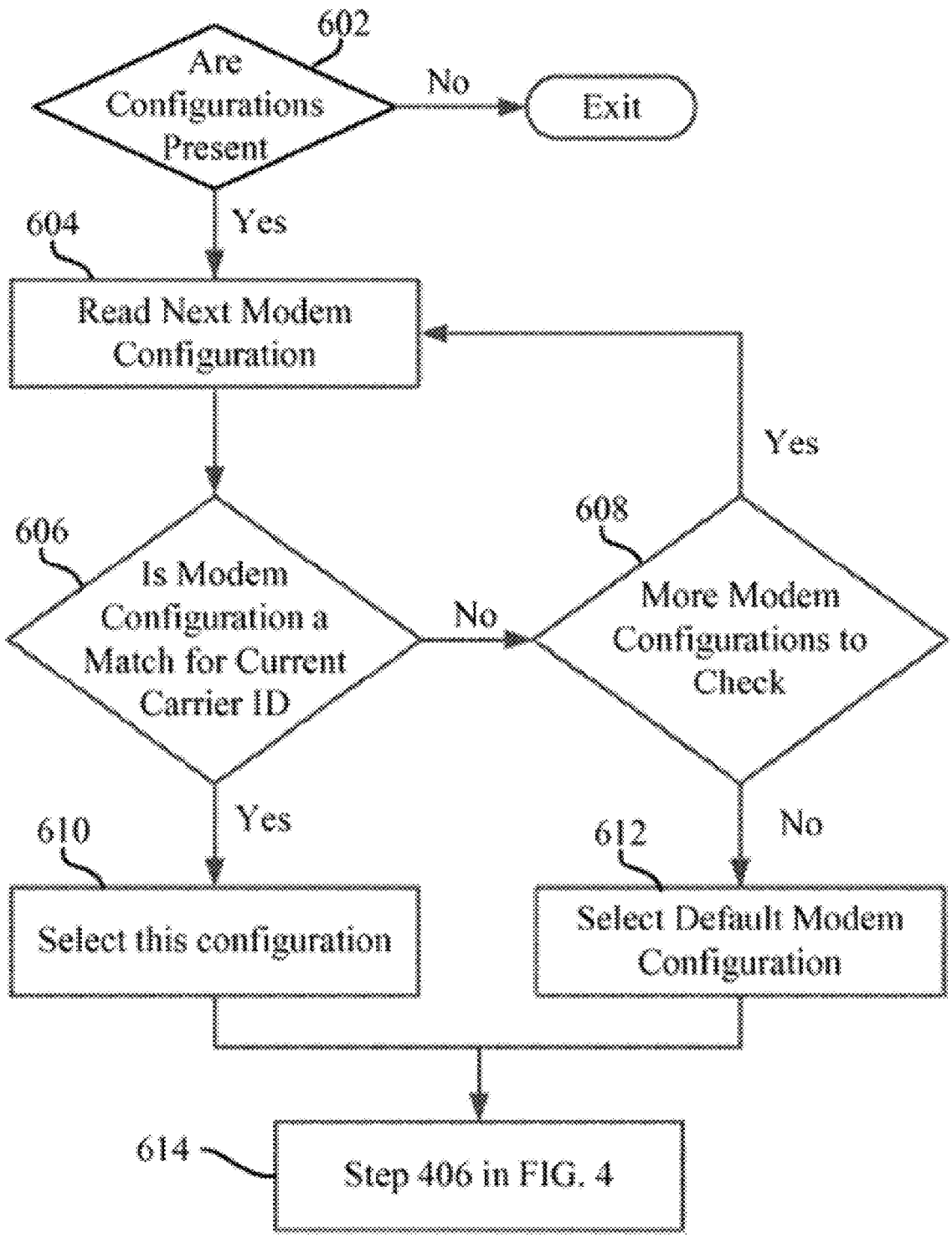
FIG. 6 is a flow diagram illustrating one example of an algorithm employable to select a modem configuration associated with a carrier identity from among a plurality of modem configurations according to some embodiments.

FIG. 6 is a flow diagram illustrating one example of an algorithm employable at the processing circuit 202 executing the modem configuration operations 220 for performing block 404 of FIG. 4. Initially, at block 602, the processing circuit 202 may determine whether there are various modem configurations available to the access terminal 200. For example, the processing circuit 202 may determine whether there are carrier-specific software images 304 and/or carrier specific software configurations 306 (see FIG. 3) included with the modem configuration data 222 stored on the storage medium 208 or otherwise accessible to the processing circuit 202. If there are not different modem configurations (e.g., different software images 304 and/or software configurations 306) available to be searched, then the processing circuit 202 may exit the algorithm, as well as the method of FIG. 4.

On the other hand, if various modem configurations (software images 304 and/or software configurations 306) are available to the processing circuit 202, then the processing circuit 202 may begin by reading a first modem configuration at block 604. In some examples, a listing of the available modem configurations may be stored in the storage medium 208 as a table that corresponds each carrier ID to a particular modem configuration (or at least to a particular software image 304 and/or software configuration 306). A table may include a listing of software images 304 and/or software configurations 306 that are to be employed for the particular modem configuration, and/or may indicate a location in the storage medium 208 where the processing circuit 202 can find the particular software image 304 and/or software configuration 306. In other examples, the processing circuit 202 may check each individual modem configuration file (such as each software image 304 and/or software configuration 306 in FIG. 3) to identify which carrier ID(s) the modem configuration file is indicated to be associated with.

After reading a modem configuration (e.g., as listed in a modem configuration table, or the modem configuration file itself), the processing circuit 202 can determine whether the modem configuration is a match for the current carrier ID 212 of the subscription module 204, at block 606. If the modem configuration is not a match for the current carrier ID 212, then the processing circuit determines whether there are more modem configurations to check at block 608. If there are more modem configurations to check, then the processing circuit 202 can return to operation 604 and read the next modem configuration.

If, at block 606, the processing circuit 202 detects a modem configuration that is associated with the carrier ID 212 of the subscription module 204, then the processing circuit 202 can select the modem configuration at block 610. On the other hand, if the processing circuit 202 goes through all the modem configurations without finding one associated with the current carrier ID 212, and determines at block 608 that there are no more modem configurations to check, then the processing circuit 202 can select a default modem configuration at block 612.

With a modem configuration selected, the processing circuit 202 can move to block 406 in the method of FIG. 4, as indicated by block 614 in FIG. 6. Referring again to FIGS. 2 and 4, the access terminal 200 may, at block 406, activate the selected modem configuration to configure the communications interface 206 to facilitate operations associated with the carrier ID. For example, the processing circuit 202 (e.g., the modem configurator 210) executing the modem configuration operations 220 may activate the selected modem configuration, which modem configuration includes a particular software image 304 and/or software configuration 306 from the modem configuration data 222. In some examples, the activation of the selected modem configuration may replace a previous modem configuration.

The modem configuration may be activated by implementing a selected modem configuration at the communications interface 206 (e.g., the modem circuit 218). Such activation can configure the communications interface 206 (e.g., the modem circuit 218) to facilitate operations associated with the carrier ID. In some instances, operations associated with the carrier ID will simply be communications with the carrier associated with the carrier ID. In other instances, operations may include other functions, such as testing operations performed by a device manufacturer.

Activating the selected modem configuration may further include rebooting or resetting the communications interface 206 to implement the new modem configuration. The rebooting/resetting can be accomplished using conventional procedures to complete reconfiguration of the communications interface 206 for performing operations associated with the carrier ID 212.

By employing one or more aspects described herein above, access terminals can automatically configure the communications interface to operate with a carrier that is currently employed by the access terminal. Thus, the access terminal can select a new modem configuration whenever the subscription module is changed to include a new carrier. As a result, an access terminal can interface and communicate with multiple terminals in a dynamic fashion.

Although examples are described above for automatically configuring the communications interface for carrier-specific operations, it should be apparent that the features described herein have further application. That is, at least some of the features described herein can be employed to automatically reconfigure the communications interface (e.g., reconfigure the hardware configuration, the software image, and/or the software configuration of the modem circuit) no matter the motivation for the reconfiguration.

For example, various features described herein may be employed by an access terminal manufacturer to perform testing to new access terminals prior to deployment with a particular carrier. In one example, the manufacturer may employ a manufacturer's subscription module including a carrier ID associated with a pre-loaded modem configuration that is intended for use in testing newly manufactured access terminals. The manufacturer's subscription module can be inserted into an access terminal. The access terminal can implement the modem configuration for testing purposes by selecting and activating a modem configuration associated with a carrier ID in the manufacturer's subscription module. After testing, the manufacturer can replace the manufacturer's subscription module with a carrier-specific subscription module, and the access terminal can automatically reconfigure the communications interface for operations with the carrier associated with the carrier-specific subscription module.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of UMTS. 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band.

The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in other examples.

Current auto-selection method may be based on ICCID/IMSI. Since ICCID includes data such as MCC, MNC, and IIN, they may be used, along with IMSI, for selection from MBN. However, MBN's are updated to encompass any changes to MCC, MNC, and IIN. Further, non-standard cards make it very complicated for the UE to select the right carrier requirements, such as home vs. roaming. Lastly, selection will be repeated for a card already inserted.

An example of selecting the best-match carrier setting includes using a dynamic XML/DB to avoid updating the MBN every time a new carrier is added and/or a new rule needs to be determined for the best match of carrier. The MBNs are modem hardware platform related and carrier network/settings that allow modem to camp onto particular network. By caching the last used SIM card information, it speeds up the algorithm for selecting the best network thereby enhancing modem key performance parameters (KPI's) to access service. Further, feature tags may be used to handle multiple MBNs per carrier/country to save memory and performance of the UE. The auto-selection solves the problem of complexity of auto-selection in certain markets (e.g., India) where it is very difficult to select the right carrier settings based on MCC/MNC alone due to roaming broker/agreements between different carriers.

Figure 7:
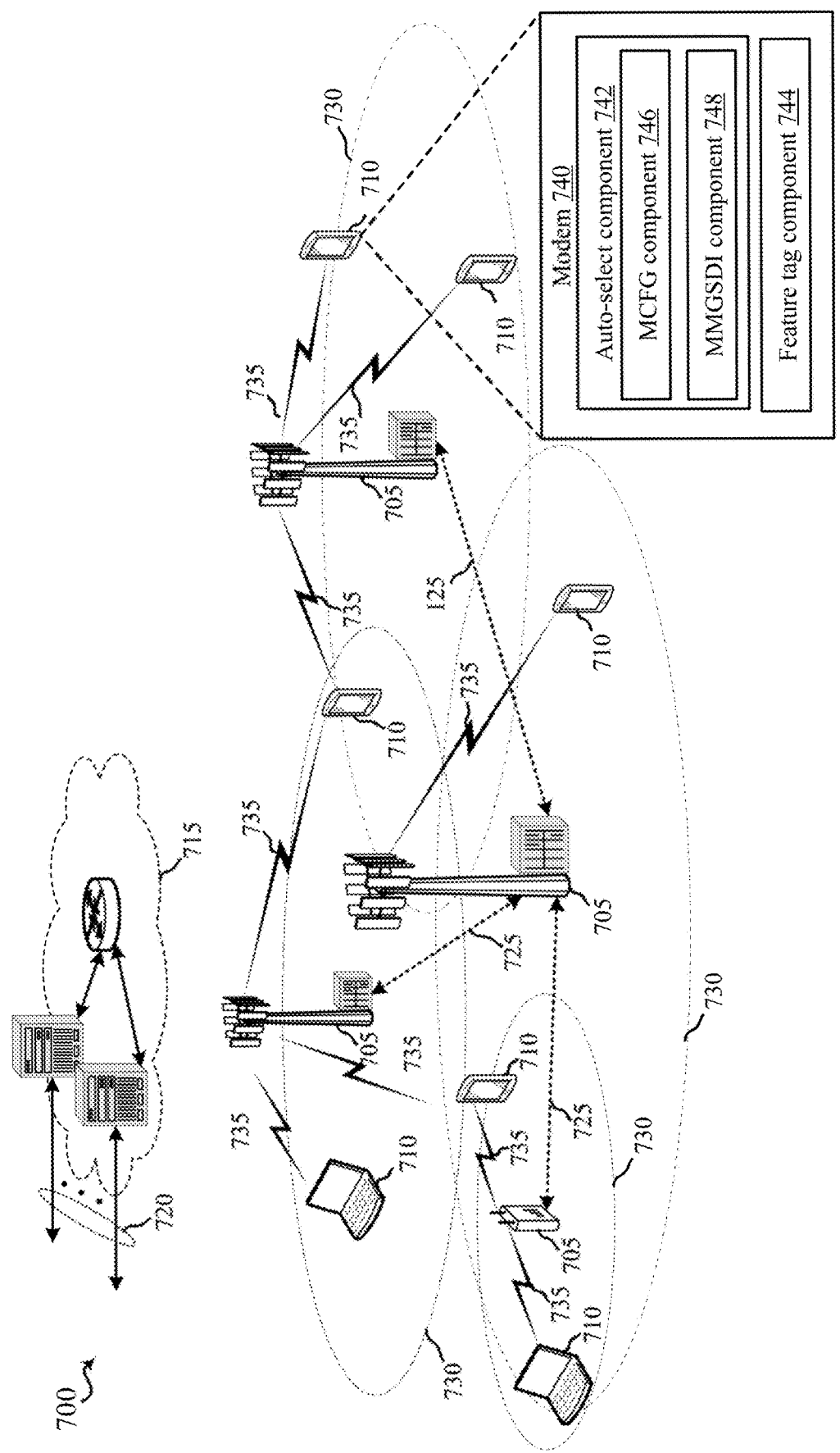
FIG. 7 is a schematic diagram of an example of a wireless communication network including at least one UE.

Referring to FIG. 7, in accordance with various aspects of the present disclosure, a wireless communication network 700 includes at least one UE 710 with a modem 740 having an auto-select component 742 that performs enhanced auto-selection of carriers, and a feature tag component 744 that manages feature tags relating to multiple MBN configurations. The auto-select component 742 includes a Modem Configuration (MCFG) sub-component 746 and a Multi-mode Generic SIM Driver Interface (MMGSDI) sub-component 748. The modem 740 may be configured to communicate via a cellular network, a Wi-Fi network, or other wireless and wired networks. The modem 740 may receive and transmit data packets. The UE 710 may be an example of the access terminal 200.

The auto-select component 742 may collect information from a local (e.g. such as a cache or NV memory) or remote database, and use the information to select the best carrier. Specifically, the auto-select component 742 may load a set of policies and analyze the features of a carrier against the policies to determine the best carrier. Once the best carrier is found, the UE 710 may connect to the best carrier.

The feature tag component 744 may load relevant feature data from the NV memory. For example, the feature tag component 744 may only load necessary groups of data from the memory and skip the unnecessary data to speed up the loading process.

The MCFG sub-component 746 and the MMGSDI sub-component 748 may collectively perform auto-selection involving carriers utilizing subscriber modules that do not conform to the ITU standard. For example, when the UE 710 begins roaming under a non-conforming carrier, the MCFG sub-component 746 may prepare the modem 740 for non-conforming carriers by updating the modem configurations. The MMGSDI sub-component 748 may negotiate with non-conforming base stations to complete the connection process.

The wireless communication network 700 may include one or more base stations 705, one or more UEs 710, and a core network 715. The core network 715 may provide user authentication, access authorization, tracking, internet protocol (IP) connectivity, and other access, routing, or mobility functions. The base stations 705 may interface with the core network 715 through backhaul links 720 (e.g., S1, etc.). The base stations 705 may perform radio configuration and scheduling for communication with the UEs 710, or may operate under the control of a base station controller (not shown). In various examples, the base stations 705 may communicate, either directly or indirectly (e.g., through core network 715), with one another over backhaul links 725 (e.g., X1, etc.), which may be wired or wireless communication links.

The base stations 705 may wirelessly communicate with the UEs 710 via one or more base station antennas. Each of the base stations 705 may provide communication coverage for a respective geographic coverage area 730. In some examples, the base stations 705 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 730 for a base station 705 may be divided into sectors or cells making up only a portion of the coverage area (not shown). The wireless communication network 700 may include base stations 705 of different types (e.g., macro base stations or small cell base stations, described below). Additionally, the plurality of base stations 705 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 730 for different communication technologies.

In some examples, the wireless communication network 700 may be or include one or any combination of communication technologies, including a NR or 5G technology, a LTE or LTE-A or MuLTEfire technology, a Wi-Fi technology, a Bluetooth technology, or any other long or short range wireless communication technology. In LTE/LTE-A/MuLTEfire networks, the term eNB may be generally used to describe the base stations 705, while the term UE may be generally used to describe the UEs 710. The wireless communication network 700 may be a heterogeneous technology network in which different types of eNBs provide coverage for various geographical regions. For example, each eNB or base station 705 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 710 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 710 with service subscriptions with the network provider. A femto cell may also cover a small geographic area (e.g., a home) and may provide restricted access and/or unrestricted access by UEs 710 having an association with the femto cell (e.g., in the restricted access case, UEs 710 in a closed subscriber group (CSG) of the base station 705, which may include UEs 710 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 710 and the base stations 705. The RRC protocol layer may also be used for core network 715 support of radio bearers for the user plane data. At the physical (PHY) layer, the transport channels may be mapped to physical channels.

The UEs 710 may be dispersed throughout the wireless communication network 700, and each UE 710 may be stationary or mobile. A UE 710 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 710 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 700. Additionally, a UE 710 may be Internet of Things (IoT) and/or M2M type of device, e.g., a low power, low data rate (relative to a wireless phone, for example) type of device, that may in some aspects communicate infrequently with wireless communication network 700 or other UEs. A UE 710 may be able to communicate with various types of base stations 705 and network equipment including macro eNBs, small cell eNBs, macro gNBs, small cell gNBs, relay base stations, and the like.

UE 710 may be configured to establish one or more wireless communication links 735 with one or more base stations 705. The wireless communication links 735 shown in wireless communication network 700 may carry uplink (UL) transmissions from a UE 710 to a base station 705, or downlink (DL) transmissions, from a base station 705 to a UE 710. The downlink transmissions may also be called forward link transmissions while the uplink transmissions may also be called reverse link transmissions. Each wireless communication link 735 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 735 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 735 may represent one or more broadcast channels.

In some aspects of the wireless communication network 700, base stations 705 or UEs 710 may include multiple antennas for employing antenna diversity schemes to improve communication quality and reliability between base stations 705 and UEs 710. Additionally or alternatively, base stations 705 or UEs 710 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 710 may be configured with multiple downlink CCs and one or more uplink CCs for carrier aggregation. Carrier aggregation may be used with both FDD and TDD component carriers. The base stations 705 and UEs 710 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 705 operating according to Wi-Fi technology, e.g., Wi-Fi access points, in communication with UEs 710 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 705 and/or UEs 710 may operate according to a NR or 5G technology referred to as millimeter wave (mmW or mmwave) technology. For example, mmW technology includes transmissions in mmW frequencies and/or near mmW frequencies. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 705 and/or UEs 710 operating according to the mmW technology may utilize beamforming in their transmissions to compensate for the extremely high path loss and short range.

Figure 8:
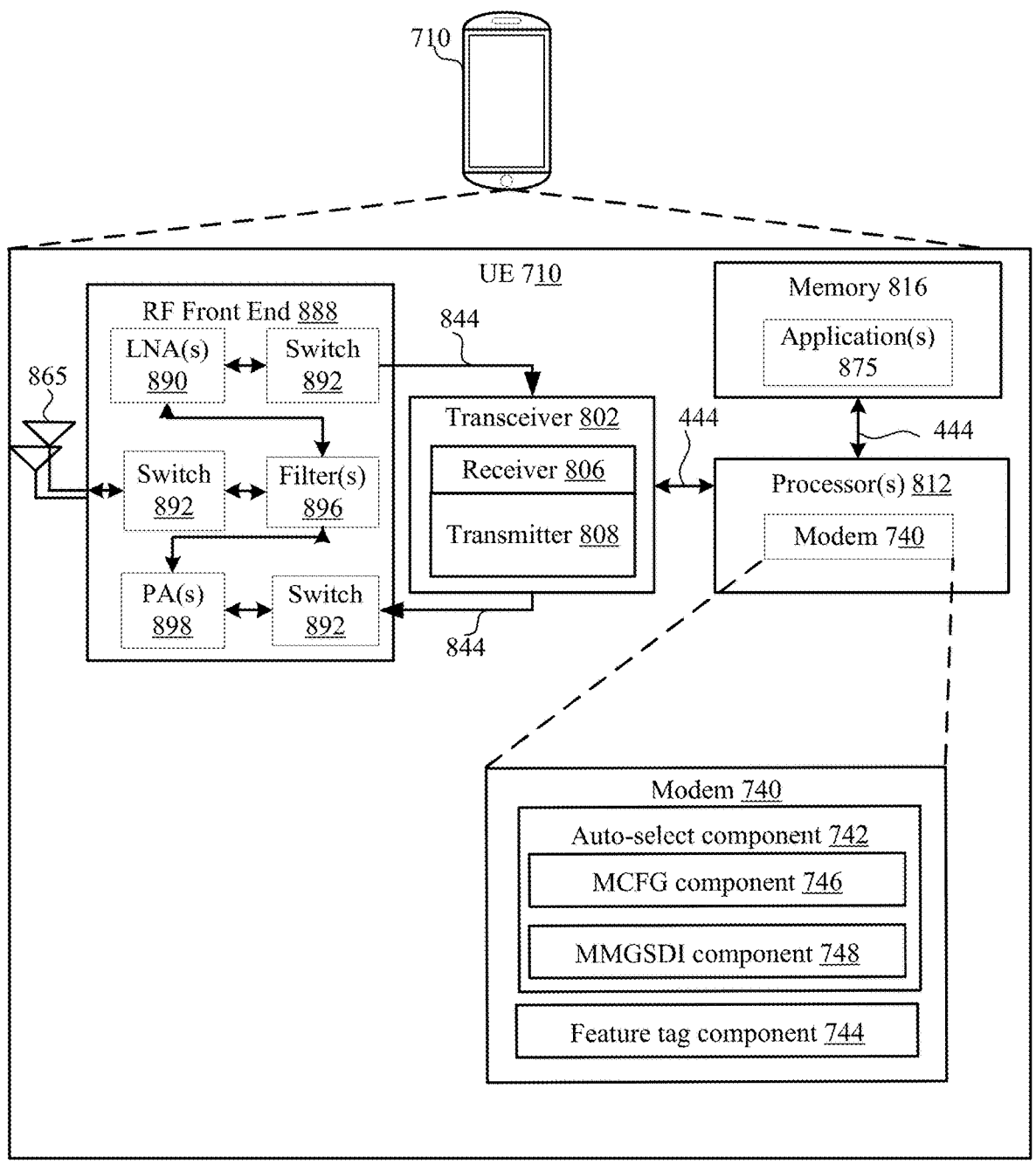
FIG. 8 is a schematic diagram of an UE.

Referring to FIG. 8, one example of an implementation of the UE 710 may include a variety of components, some of which have already been described above, but including components such as one or more processors 812 and memory 816 and transceiver 802 in communication via one or more buses 844, which may operate in conjunction with modem 740 and the auto-selection component 742 to enable one or more of the functions described herein related to the enhanced auto-selection of carriers. Similarly, the components in the UE 710, such as the modem 740 and the feature tag component 744, may operate to perform the functions relating to the management of feature tags. Further, the one or more processors 812, modem 740, memory 816, transceiver 802, RF front end 888 and one or more antennas 865, may be configured to support voice and/or data calls (simultaneously or non-simultaneously) in one or more radio access technologies.

In an aspect, the one or more processors 812 can include a modem 740 that uses one or more modem processors. The various functions related to the enhanced auto-selection component 742 and/or the feature tag component 744 may be included in modem 740 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 740 may be performed by transceiver 802.

Also, memory 816 may be configured to store data used herein and/or local versions of applications 875 or the enhanced auto-selection component 742 and/or the feature tag component 744 being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining the enhanced auto-selection component 742 and/or the feature tag component 744 and/or data associated therewith, when UE 710 is operating at least one processor 812 to execute the enhanced auto-selection component 742 and/or the feature tag component 744.

Transceiver 802 may include at least one receiver 806 and at least one transmitter 808. Receiver 806 may include hardware, firmware, and/or software code executable by a processor for receiving data, the code comprising instructions and being stored in a memory (e.g., computer-readable medium). Receiver 806 may be, for example, a RF receiver. In an aspect, receiver 806 may receive signals transmitted by at least one base station 725. Additionally, receiver 806 may process such received signals, and also may obtain measurements of the signals, such as, but not limited to, Ec/Io, SNR, RSRP, RSSI, etc. Transmitter 408 may include hardware, firmware, and/or software code executable by a processor for transmitting data, the code comprising instructions and being stored in a memory (e.g., computer-readable medium). A suitable example of transmitter 808 may including, but is not limited to, an RF transmitter.

Moreover, in an aspect, UE 710 may include RF front end 888, which may operate in communication with one or more antennas 865 and transceiver 802 for receiving and transmitting radio transmissions, for example, wireless communications transmitted by at least one base station 725 or wireless transmissions transmitted by UE 710. RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 485 via RF front end 888. In an aspect, transceiver may be tuned to operate at specified frequencies such that UE 710 can communicate with, for example, one or more base stations 725 or one or more cells associated with one or more base stations 725. In an aspect, for example, modem 740 can configure transceiver 802 to operate at a specified frequency and power level based on the UE configuration of the UE 710 and the communication protocol used by modem 740.

In an aspect, modem 740 can be a multiband-multimode modem, which can process digital data and communicate with transceiver 802 such that the digital data is sent and received using transceiver 802. In an aspect, modem 740 can be multiband and be configured to support multiple frequency bands for a specific communications protocol. In an aspect, modem 740 can be multimode and be configured to support multiple operating networks and communications protocols. In an aspect, modem 740 can control one or more components of UE 710 (e.g., RF front end 888, transceiver 802) to enable transmission and/or reception of signals from the network based on a specified modem configuration. In an aspect, the modem configuration can be based on the mode of the modem and the frequency band in use. In another aspect, the modem configuration can be based on UE configuration information associated with UE 710 as provided by the network during cell selection and/or cell reselection.

The UE 710 may be similar to the access terminal 200. The one or more antennas 865 may be similar to the one or more antennas 214. The memory 816 may be similar to the storage medium 208. The RF front end 888 may be similar to the communication interface 206. The transceiver 802 may be similar to the RF transceiver circuit 216. The processors 812 may be similar to the processing circuit 210.

Figure 9:
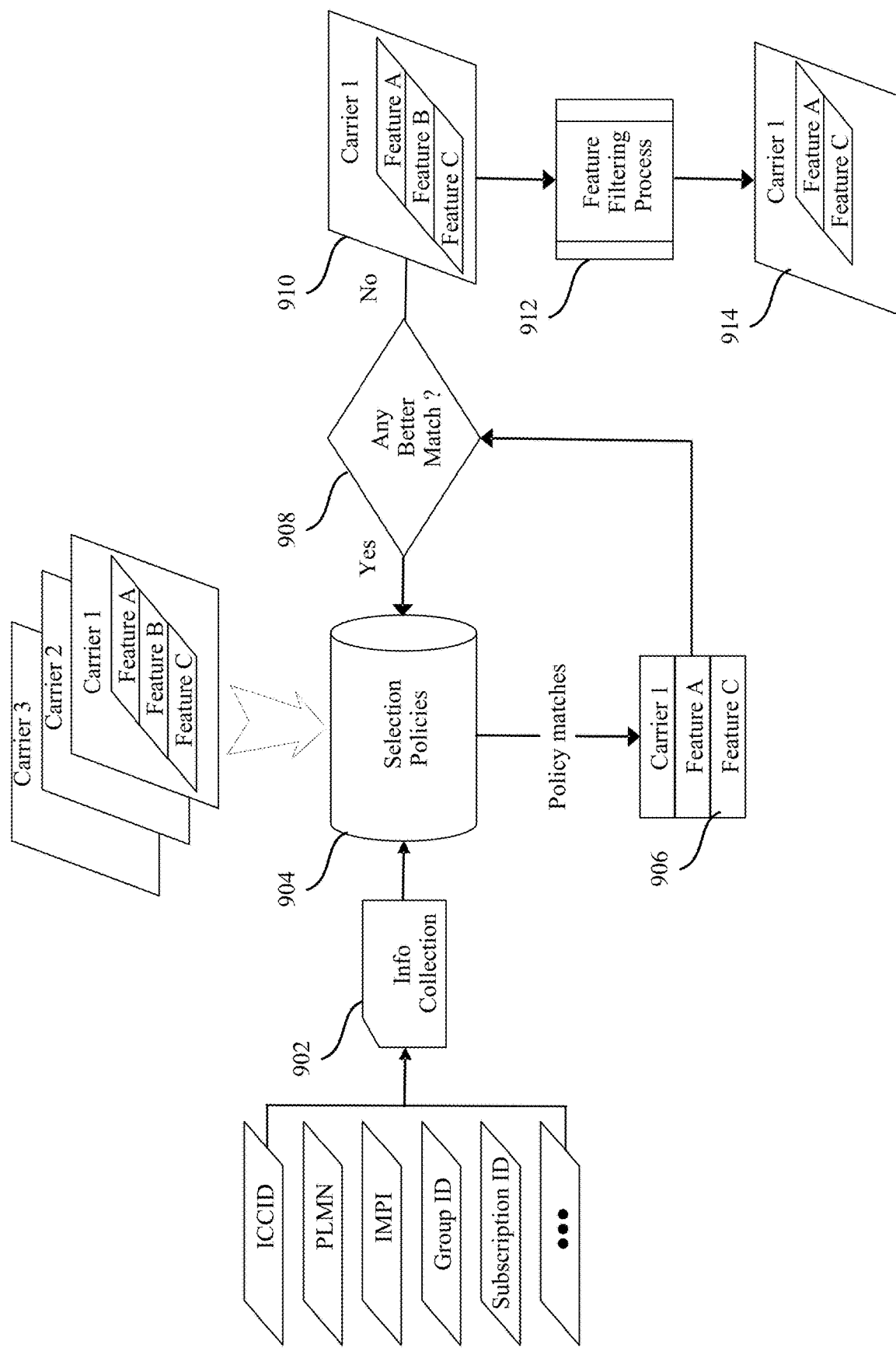
FIGS. 9-11 are flow diagrams illustrating examples of enhanced auto-selection.

A method for enhanced auto-selection may be described in FIG. 9. The auto-select component 742 stores the values of MCC, MNC, IIN, group ID (GID), Service Provider Name (SPN), and/or IMS private identity (IMPI) into a local database during the information collection operation 902. One or more pre-populated databases can be included in the default MBN. Next, the auto-select component 742 access a list of selection policies to identify 904 the best carrier. Each carrier may include one or more features. If there is a positive match 906 for the carrier, the auto-select component 742 may next determine 908 if there is any better match. If there are other candidate carriers, the auto-select component 742 may continue the policy selection process to identify 904 a better carrier. If there are no better matches, the auto-select component 742 may select 910 a carrier, such as carrier 1, and conducts the feature filtering process 912 to remove unwanted/unsuitable features from the carrier. The auto-select component 742 ultimately selects 914 the best carrier, which may exclude some features filtered out during the feature filtering process.

Figure 10:
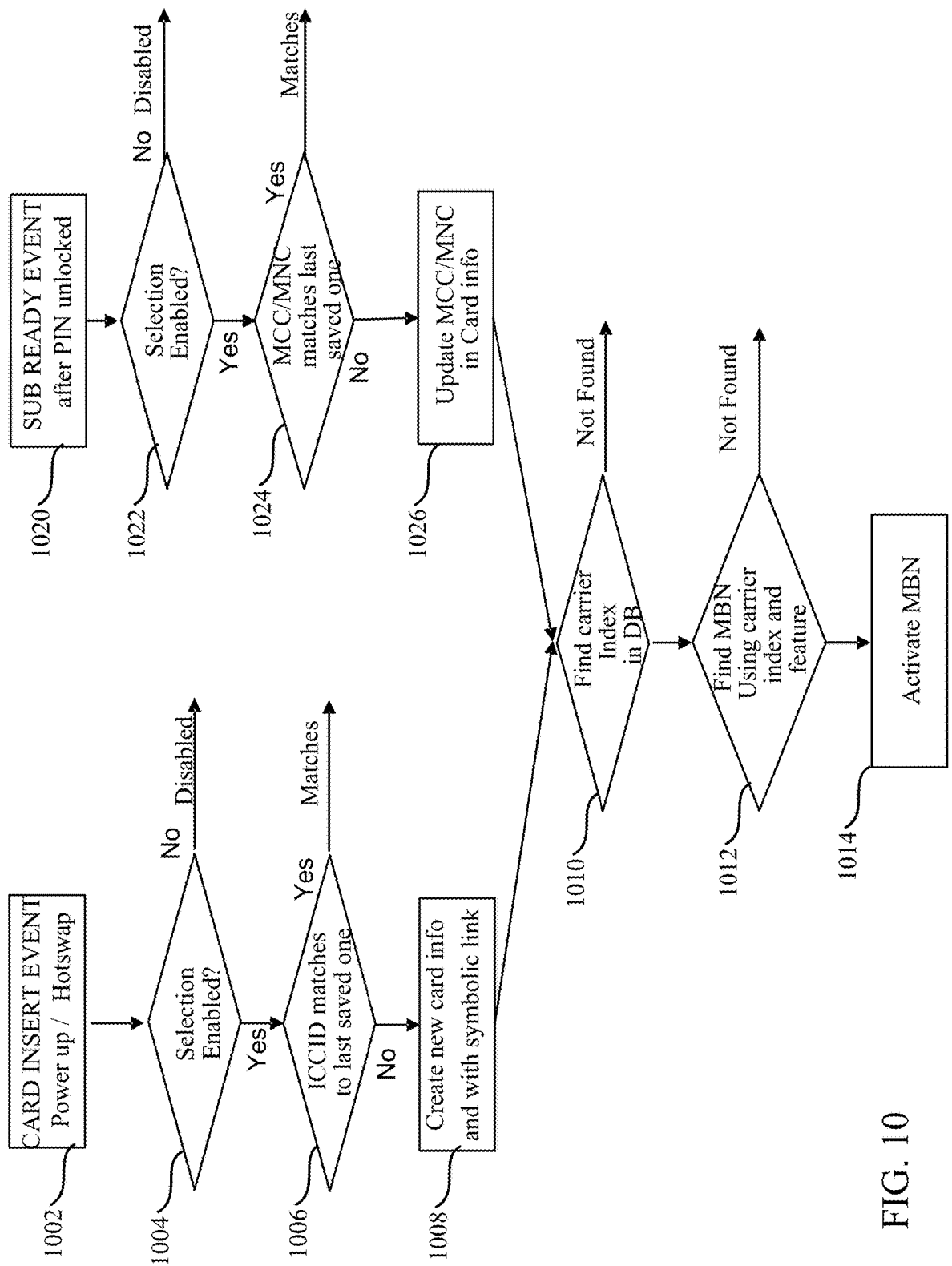

Referring now to FIG. 10, in some implementations, during a card insertion 1002 event (e.g. power up or hotswap of subscription module), the auto-select component 742 may first determine 1004 if the selection process is enabled or disabled. If disabled, the auto-select component 742 takes no action. If the selection process is enabled, the auto-select component 742 may determine 1006 if the ICCID matches to the previously saved one, such as the last saved ICCID. If there is a match, the UE connects to the ICCID. If there is no match, the auto-select component 742 creates 1008 a new card information with symbolic link. Here, all the inserted card will be saved for speedy reselection. The information stored may include ICCID, 3GPP PLMN list, 3GPP3 PLMN list, GID, SPN, IMPI, selected carrier index, and/or selected configuration ID. Next, the UE finds 1010 an appropriate carrier index in an internal database. If the index is not found, the auto-select component 742 takes no action. If the index is found, the auto-select component 742 attempts to find 1012 the MBN configuration using the carrier index and features. If the MBN configuration is not found, the auto-select component 742 takes no action. Once the MBN is located, the auto-select component 742 may activate 1014 the MBN.

Still referring to FIG. 10, during a SUB READY 1020 event (after personal identification number unlocked), the UE 710 once again determines 1022 if the selection process is enabled. If the selection process is not enabled (i.e. disabled), the auto-select component 742 takes no action. If the selection process is enabled, the auto-select component 742 may determine 1024 if the MCC and/or the MNC match the last save MCC/MNC. If there is a match, the UE 710 connects to the ICCID. In a negative match, the UE 710 updates the MCC and MNC in the existing card information of the subscription module. Next, the auto-select component 742 continues to operation (1010) as described above. In certain implementations, a carrier API may be provided for technology modules to query.

Figure 11:
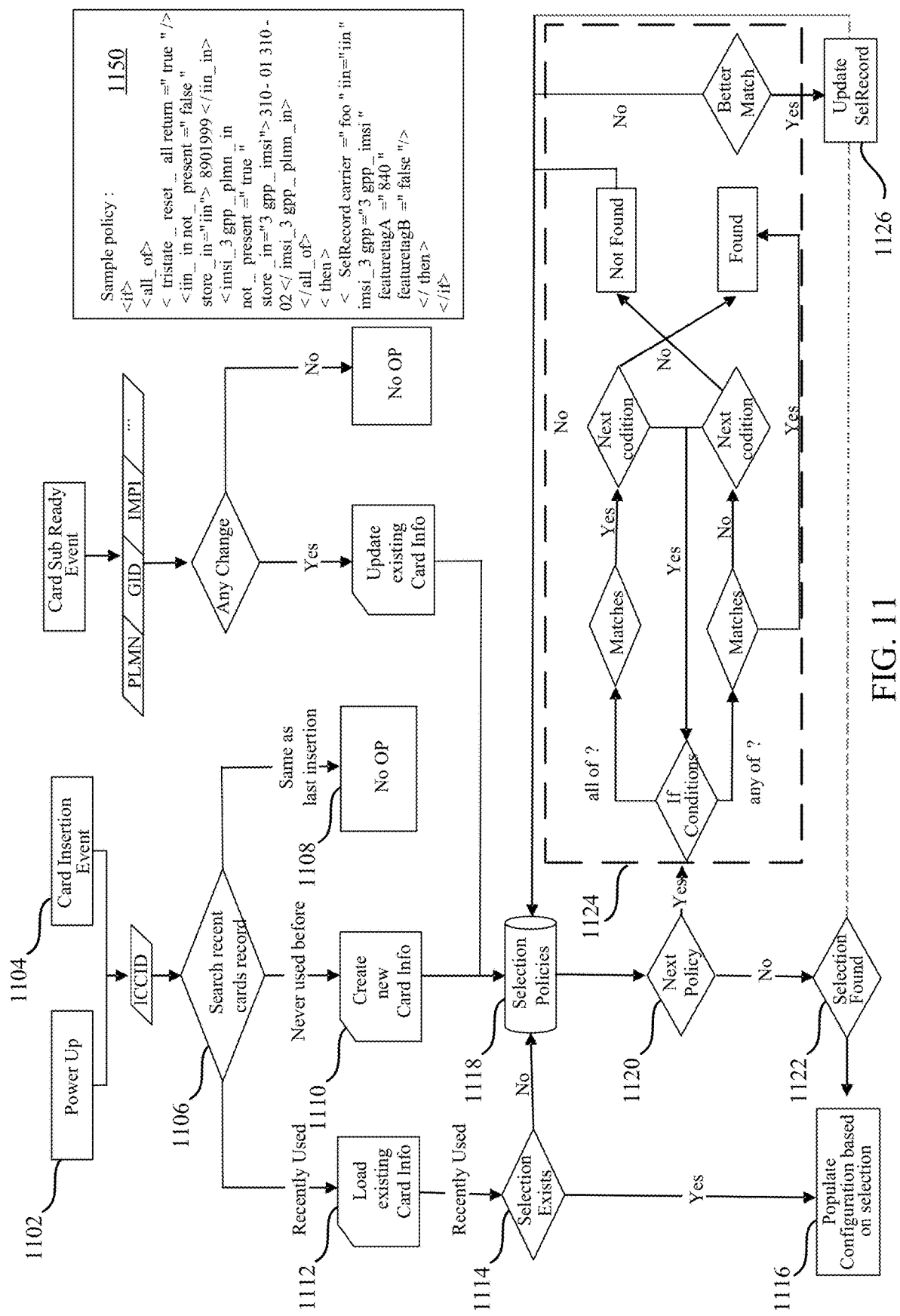

Referring now to FIG. 11, which illustrates a detailed block diagram of the enhanced auto-selection method. The auto-select component 742 may begin with a power up 1102 or card insertion event 1104. After the identification of the ICCID, the auto-select component 742 searches 1106 recent card records for a match. If the ICCID matches the last insertion, then no action is taken 1108. If the ICCID has never been used before, the auto-select component 742 creates 1110 a new card information. If the ICCID has been used recently, but does not match the latest insertion, the auto-select component 742 loads existing card information. Next, the auto-select component 742 determines 1114 if selection exists. If selection exists, then the auto-select component 742 populates 1116 the MBN configuration based on the existing selection. If not, the auto-select component 742 begins the selection process of the policies 1118. First, the auto-select component 742 determines if there is a next policy 1120. If no, the auto-select component 742 assumes a selection has been found 1122 and proceeds to populate 1116 the MBN as described above. If there is a next policy, the auto-select component 742 iteratively searches for a selected carrier. For example, the auto-select component 742 may evaluate 1124 one or more conditions to search for a better match. Once a better match is found, the auto-select component 742 updates 1126 the SelRecord field. The auto-select component 742 may continue this process until no more policy can be found. Element 1150 illustrates a sample policy.

Figure 12:
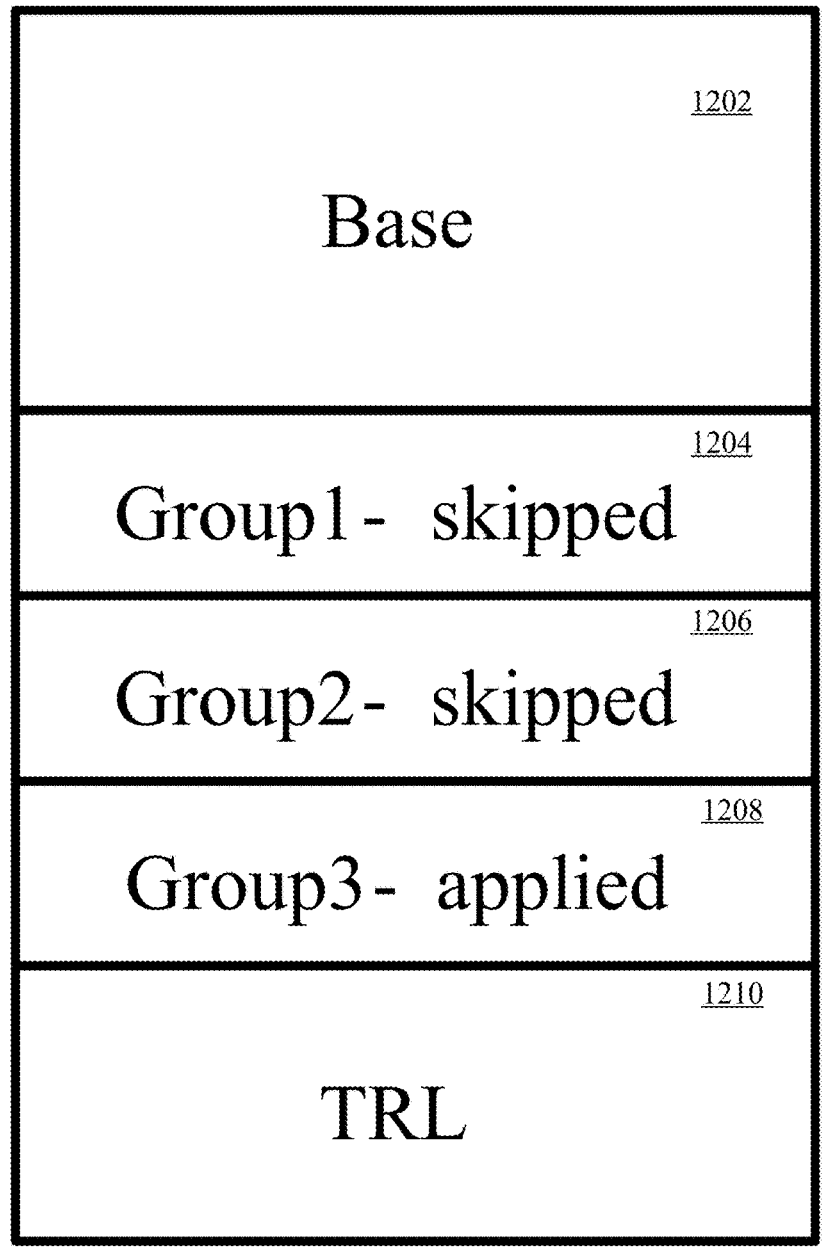
FIG. 12 is an example stack with MBN.

Referring now to FIG. 12, a memory stack 1200 may show an example MBN. The stack 1200 may include a base 1202, a group 1 section 1204, a group 2 section 1206, a group 3 section 1208, and a trailer record (TRL) section 1210. The memory stack 1200 may be a single MBN logically partitioned into many groups 1204, 1206, 1208. The base 1202 may include information common to all the groups. Each group may include market specific settings. For example, the groups 1204, 1206, 1208 may include one or more of the following groups: automotive, Internet of Everything (IoE), voice over LTE only, non-voice-over LTE, fallback or commercial laboratory, sub-carriers (e.g. from different regions), single SIM, dual SIM, Dual Radio (DR) configuration, Single Radio (SR) configuration, subsidized type 1, and subsidized type 2. By logically partitioning the groups, the feature tag component 744 may process the base configuration every time, and skip unnecessary groups by only applying the necessary groups. This may have the benefits of more straightforward testing process, reducing memory usage, reducing MBNs, and easily supporting new variants.

In some implementations, the feature tag component 744 may manage feature data that accesses particular groups. The feature data may include strings representing enumerated values used in XML, such as strings in condition, name, and expression variables that are placed with integer values during MBN generation. The components of the feature tag may include condition attribute (e.g. conditional directive), name attribute (e.g. feature scope for which the conditional expression is evaluated to be true or false), and feature tag member value (e.g. conditional expression). During phase 1, the feature tag component 744 may support simple conditional expressions with simple logic functions. Phase 2 may allow the feature tag component 744 to support extended conditional expressions with more complex logic functions.

FIG. 13 shows an example feature tag structure similar to NV data items with MBN entries.

In some implementations, setting features on target by the feature tag component 744 may include enabling/storing status of features. Features may be enabled using the pdc_set_feature( ) command, and each feature corresponds to an optional TLV structure. Valid TLV values may come from respective enumerations. The structures for storing feature variable states may be enabled/disabled across all subscriptions using the following command and inputs: mcfg_setting_s_type mcfg_setting[MCFG_NUM_OF_UIM_SLOT]. Further, the processing state may be determined by the stack state, which identifies whether storage items will be processed or skipped. Specifically, a Boolean value of 1 may indicate that the modem configuration (MCFG) items are processed normally, and a value of 0 may indicate that the MCFG configuration items are skipped.

Figure 14:
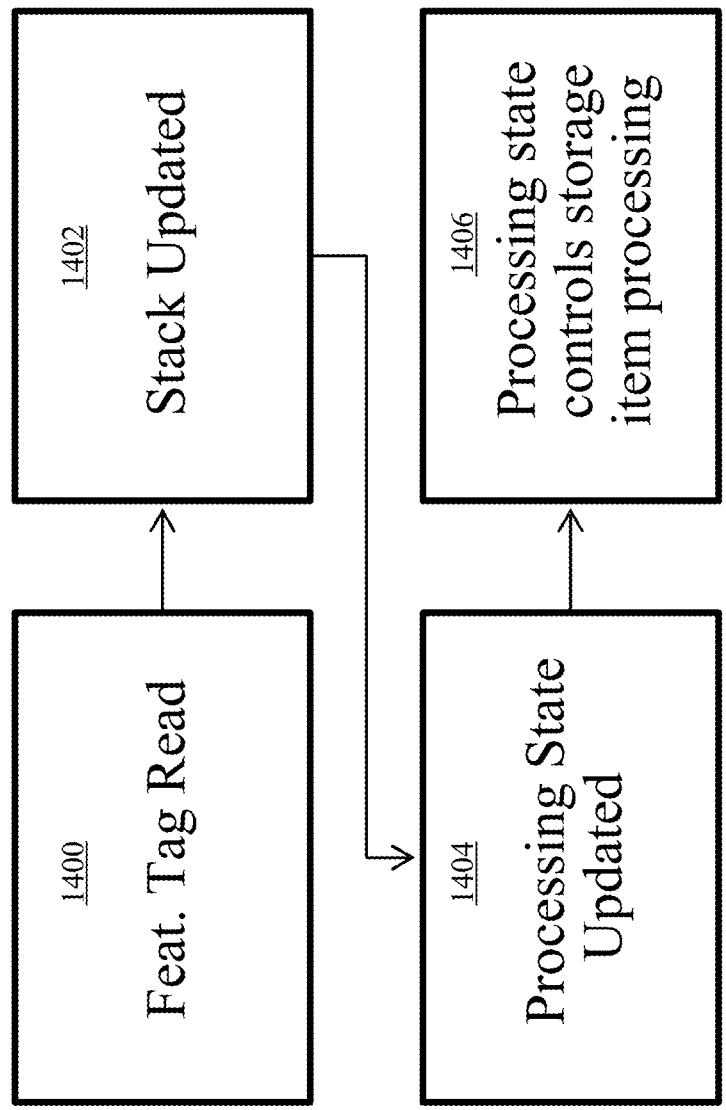
FIG. 14 is a diagram illustrating an example feature implementation.

Regarding the feature implementation details, referring to FIG. 14, the processing state may be determined by the current stack state (e.g. processing state=state of stack->top( )). The stack design may include feature conditions that are analogous to C preprocessor directives: # if, # elif, # else, and # endif. Any IF tag listed before a preceding feature's ENDIF tag is treated as a "nested" feature. In operation (1400), the feature tags are read by the feature tag component 744. Next, the stack is updated (1402), followed by the updating of the processing state (1404). Next, the processing state controls (1406) storage item processing.

Figure 15:
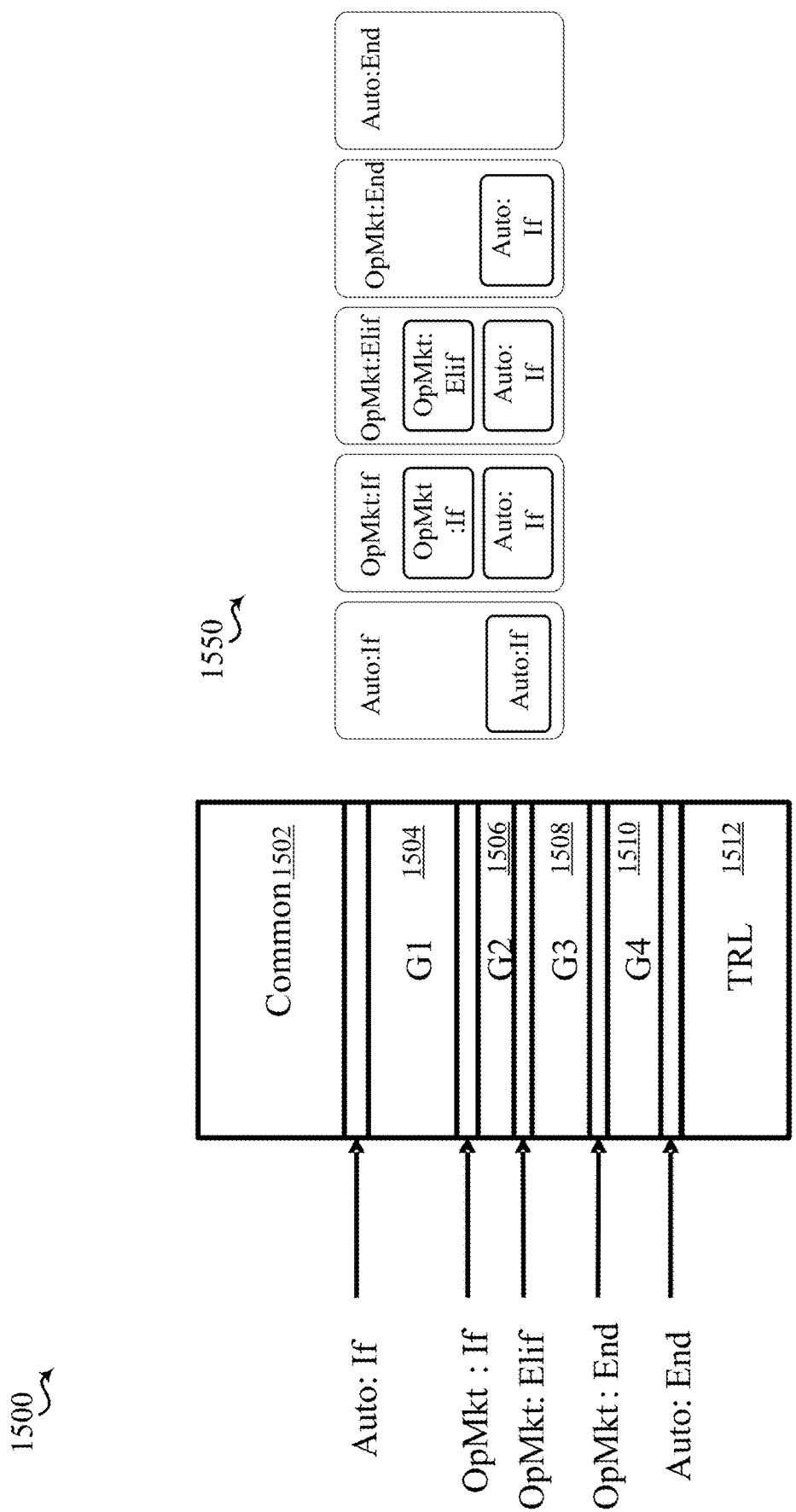
FIGS. 15-16 are example stacks with MBN.

Referring now to FIG. 15, an example memory stack 1500 includes a common section 1502, sections G1-G4, 1504, 1506, 1508, and 1510 respectively, and a TRL section 1512. The feature may be processed according to diagram 1550. Here, the stack is modified based on conditional operators. For an "if" operator, the feature tag component 744 always pushes to stack 1500. For an "elif" and/or # else operator, the feature tag component 744 modifies the stack top. For an "endif" operator, the feature tag component 744 pops the stack 1500.

Figure 16:
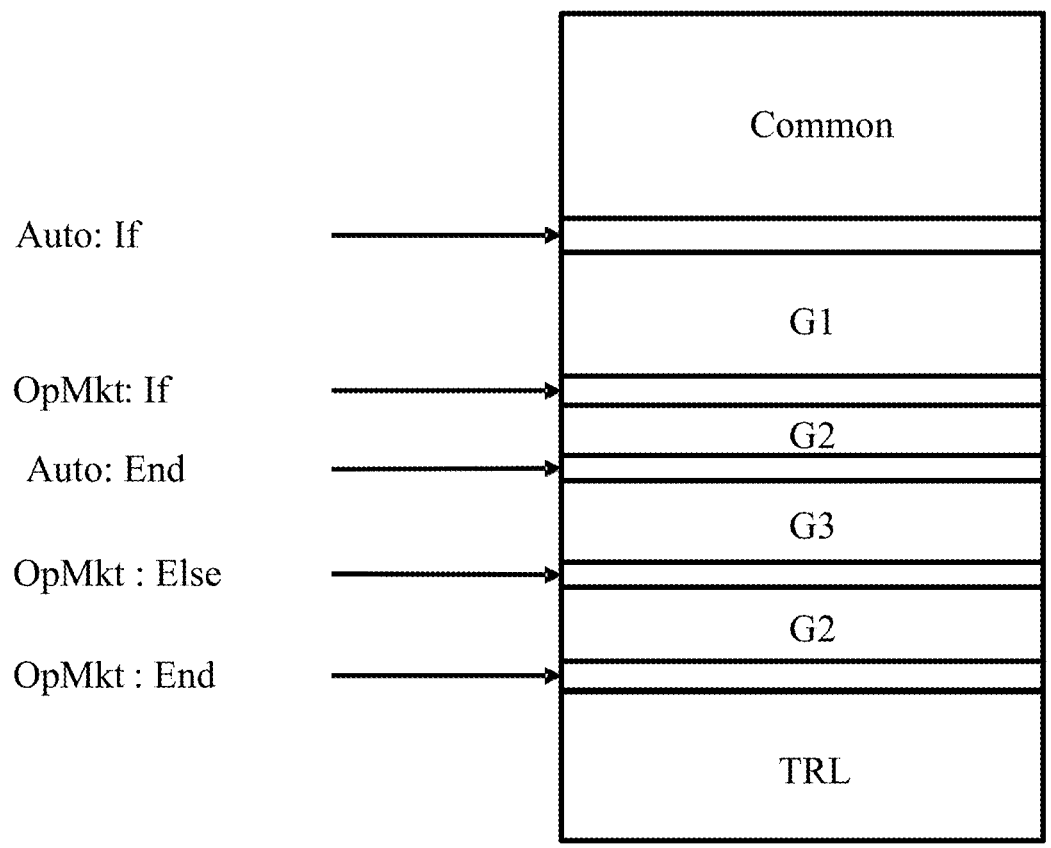

A feature implementation may include the validation of feature tags. For off target feature tag validation, the feature tag validation is performed during MBN generation. For on target feature tag validation, the MCFG segment may be parsed in mcfg_utils_add_config( ) operation during MBN load. The parsing check may be paired with mcfg_efs_add_config( ) and/or mcfg_remote_add_config( ) operations. The parsing process verifies that feature conditions are properly ordered and contain valid data. FIG. 16 illustrates an example feature nesting that may cause load failure.

Figure 17:
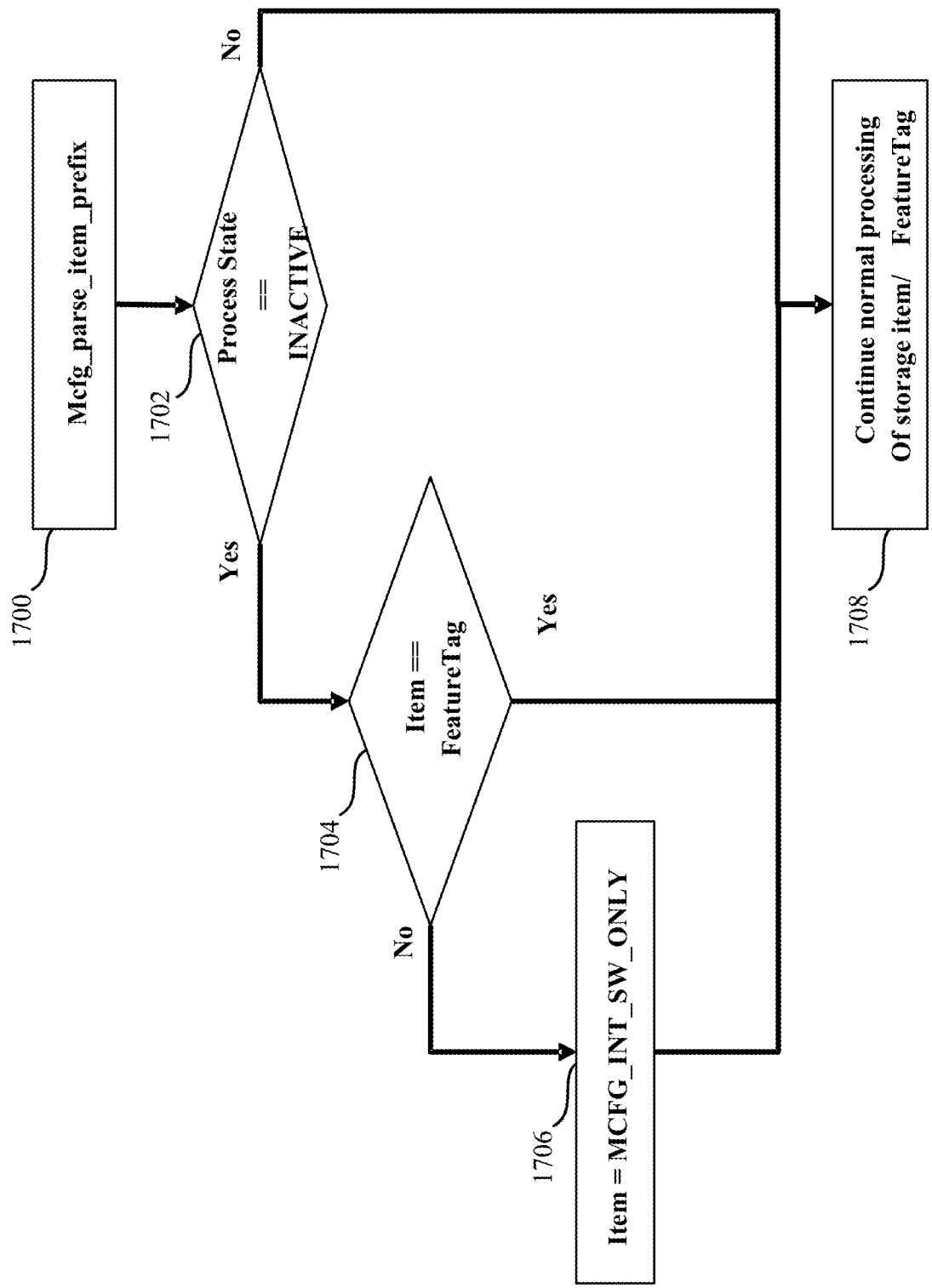
FIGS. 17-23 are example flow diagrams illustrating examples of feature tag processing.

In some implementations, the general storage item processing may be based on the processing state. A Boolean value of 0 indicates an inactive state where the storage items are treated as SW_ONLY, which may be ignored. A Boolean value of 1 indicates an active state where the storage items are processed normally. In certain implementations, there may be a need to process feature tags in inactive states in case they change processing states. Turning to FIG. 17, in some aspects, the validation process begins with the operation Mcfg_parse_item_prefix 1700. Next, if the feature tag component 744 determines 1702 if the process state is inactive. If not, the feature tag component 744 continues 1708 with normal processing of storage item and/or feature tag. If the process state is inactive, the feature tag component 744 determines 1704 if the item is a feature tag. If the item is a feature tag, the process continues to operation 1708 with normal processing. If not, the feature tag component 744 sets 1706 the item as MCFG_INT_SW_ONLY.

Figure 18:
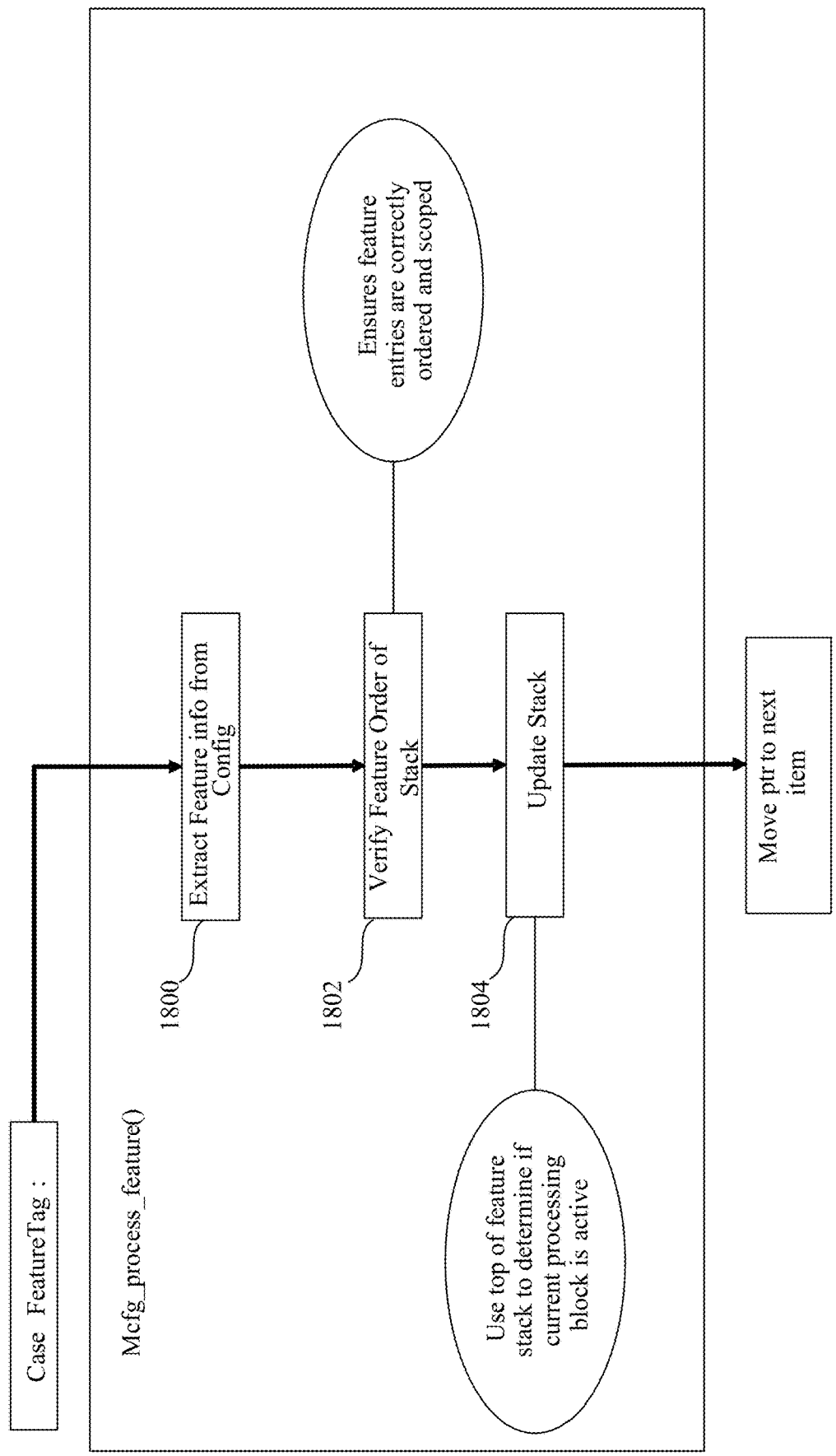

During the feature tag processing, the feature tag component 744 may apply feature data according to the diagram shown in FIG. 18. First, the feature tag component 744 extracts 1800 the feature information from the configuration file. Next, the feature tag component 744 verifies 1802 the feature order of the stack. This ensures feature entries are correctly ordered and scoped. Next, the feature tag component 744 updates 1804 the stack. It also uses the top of the feature stack to determine if the current processing block is active. The entire process may be executed using the Mcfg_process_feature( ) command.

Figure 19:
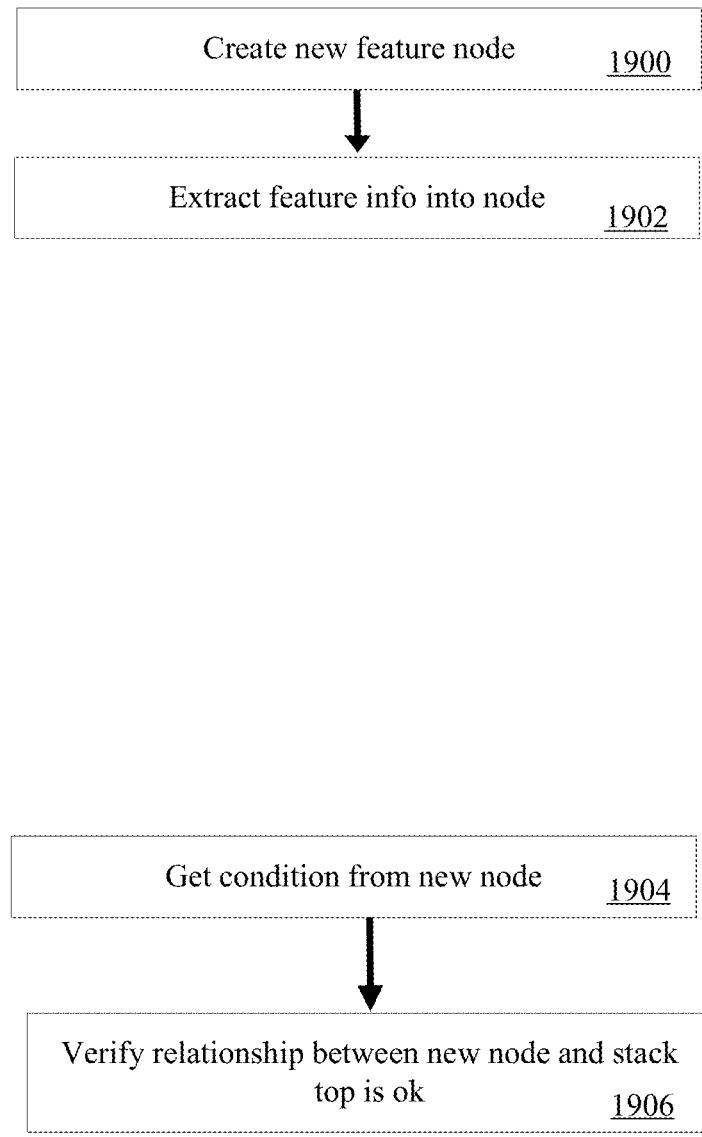

The applying feature data operation may require the extraction and verification of data shown in FIG. 19. For the extraction process, the feature tag component 744 may utilize the operation of mcfg_feat_info_unpack( ) to create 1900 a new feature node, and subsequently extract 1902 the feature information into the new feature node. For the verification process, the feature tag component 744 may execute the mcfg_verify_feature_order( ) operation to get 1904 condition from the new node and verify 1906 that the relationship between the new node and the stack top is acceptable.

Figure 20:
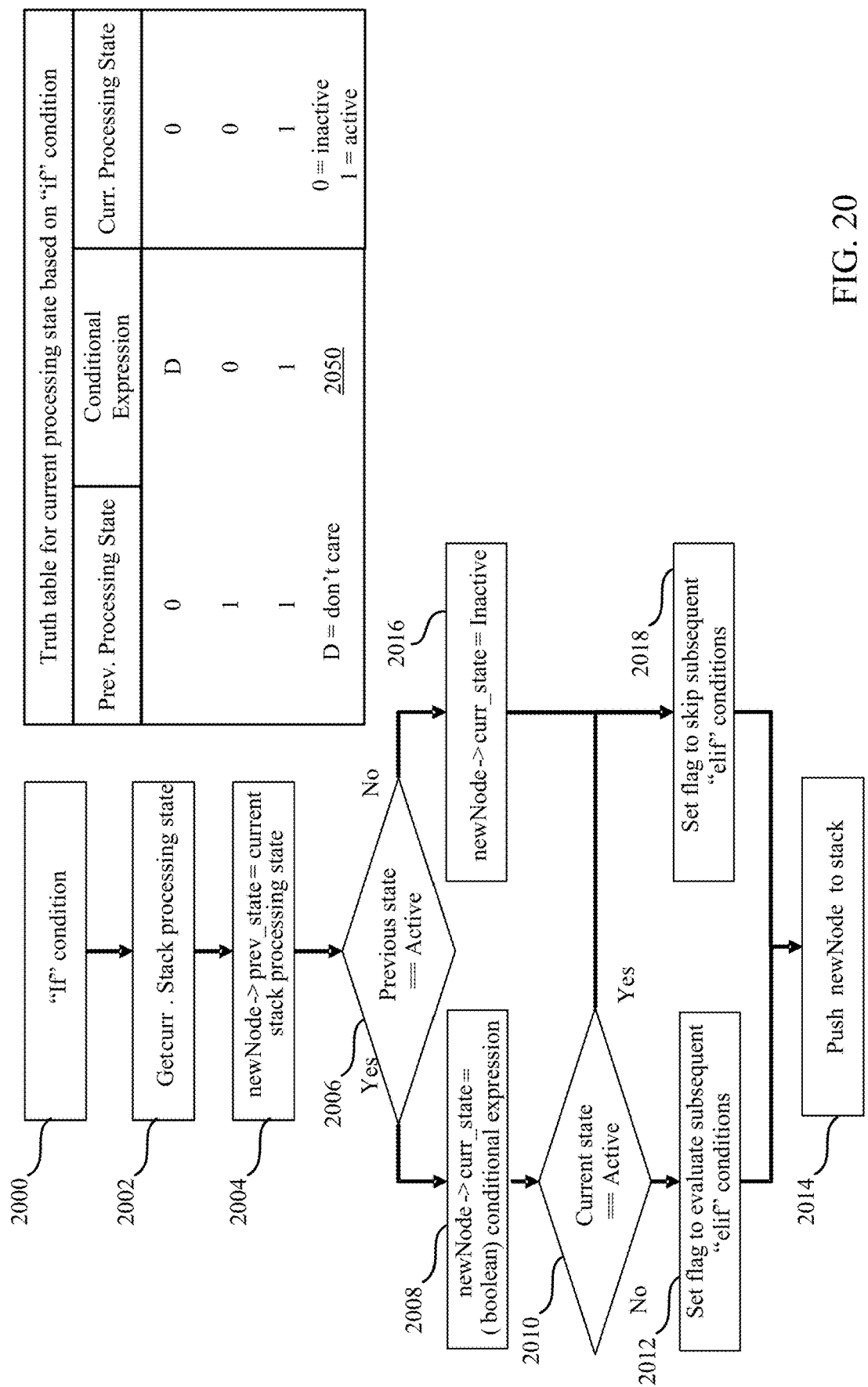

During the feature stack update under the "IF" condition, as shown in FIG. 20, the feature tag component 744 may apply the mcfg_feat_stack_update( ) operation. Once the "if" condition is verified 2000, the feature tag component 744 gets 2002 the current stack processing state. Next, the feature tag component 744 may set 2004 the newNode->prev_state to equal to the current stack processing state. In operation 2006, the feature tag component 744 determines if the previous state is active. If yes, the feature tag component 744 sets 2008 the newNode->curr_state value to the Boolean value of the conditional expression. Next, the feature tag component 744 determines 2010 if the current state is active. If no, the feature tag component 744 sets 2012 flag to evaluate the subsequent "elif" conditions, and then pushes 2014 the newNode to the stack. If the previous state in operation 2006 is not active, the feature tag component 744 sets the newNode->curr_state value to inactive. Next, the feature tag component 744 sets 2018 the flag to skip subsequent "elif" conditions, and then proceeds to operation 2014 as described above. If the current state in operation 2010 is active, the feature tag component 744 proceeds to operation 2018. An example truth table 2050 illustrates the Boolean expressions for the current processing state based on the "if" condition.

Figure 21:
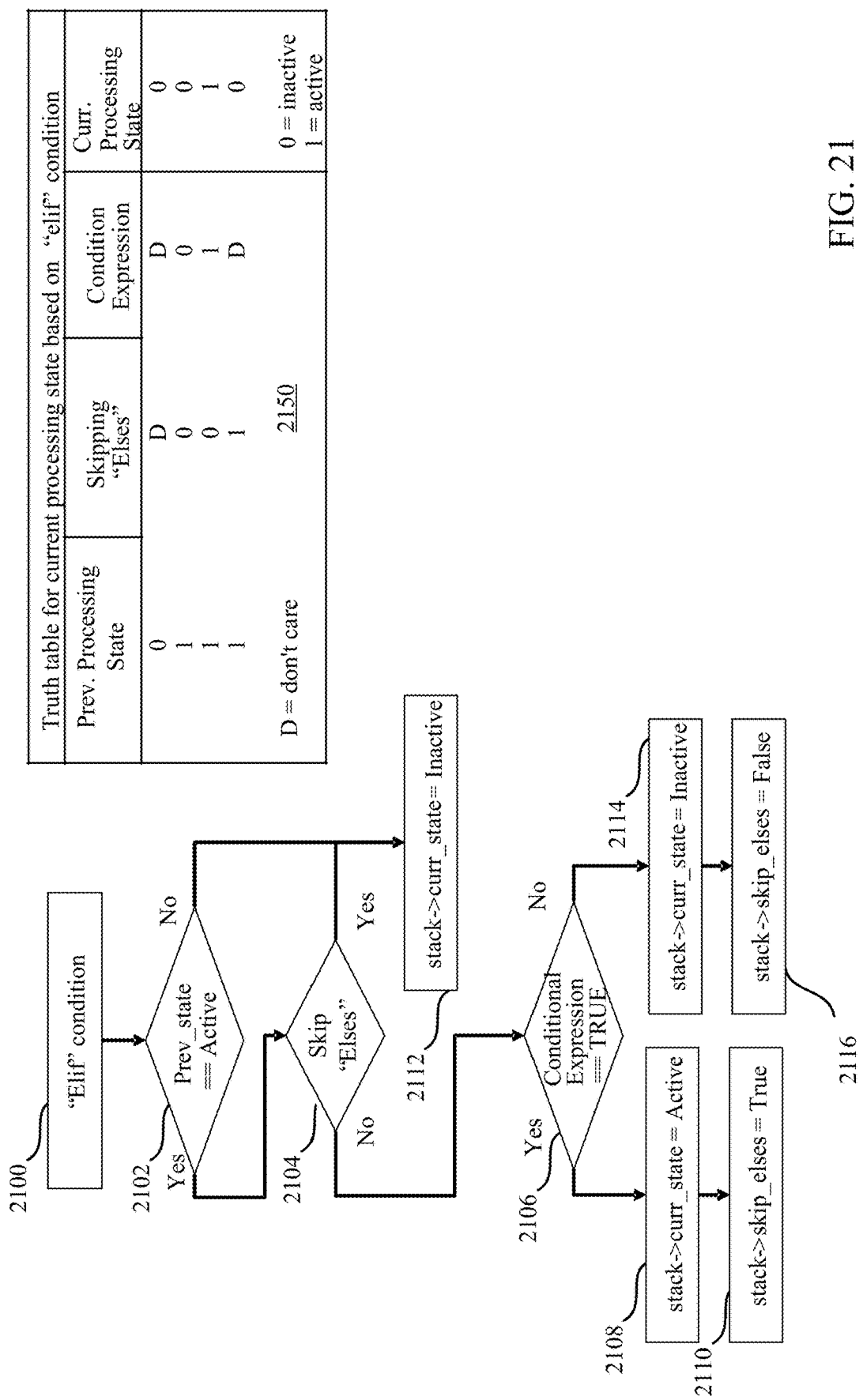

During the feature stack update under the "ELIF" condition, as shown in FIG. 21, the feature tag component 744 may apply the mcfg_feat_stack_update( ) operation. Once the "elif" condition is verified 2100, the feature tag component 744 determines 2102 if the previous state is active. If yes, the feature tag component 744 may determine whether to skip 2104 "elses." If no, the process moves to operation 2106, where the feature tag component 744 determines if the conditional expression is true. If either the previous state is inactive in operation 2102 or the feature tag component 744 determines to skip the "elses," the process progresses to operation 2112 where the stack-curr_state value is set to inactive. If the conditional express in operation 2106 is determined to be true, the feature tag component 744 sets 2108 the stack->curr_state to active and sets 2110 the stack->skip_elses to be true. If the conditional express in operation 2106 is determined to be not true, the feature tag component 744 sets 2114 the stack->curr_state to inactive and sets 2116 the stack->skip_elses to be false. There may not be a need to check the stack->curr_state, and the skip "elses" operation 2104 reflects the curr_state. An example truth table 2150 illustrates the Boolean expressions for the current processing state based on the "elif" condition.

Figure 22:
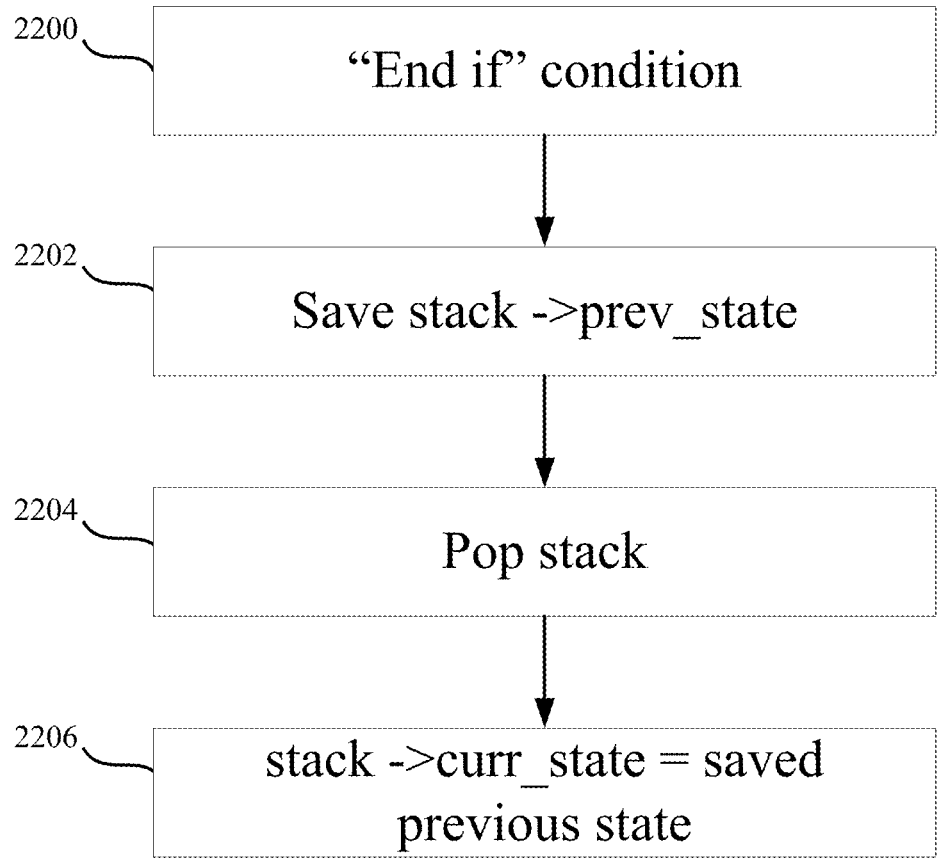

During the feature stack update under the "END IF" condition, as shown in FIG. 22, the feature tag component 744 may apply the mcfg_feat_stack_update( ) operation. Once the "elif" condition is verified 2200, the feature tag component 744 may save 2202 the stack->prev_state value, pops 2204 the stack, and then sets 2206 the stack->curr_state value to the saved previous state value.

Figure 23:
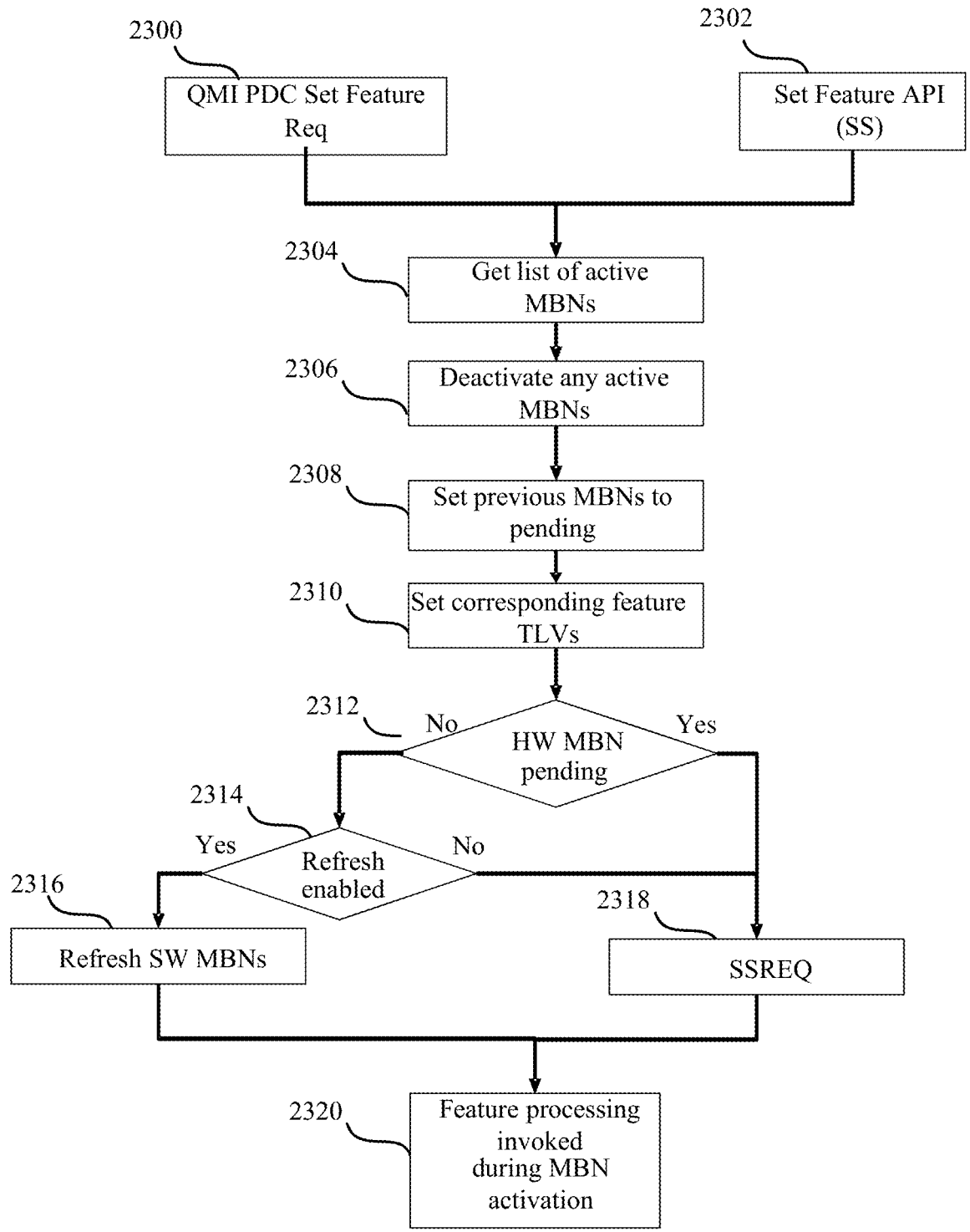

Turning now to FIG. 23, in some implementations, the feature tag component 744 may initiate a feature refresh process. The process begins with the Qualcomm MSM Interface (QMI) persistent device configuration (PDC) setting 2300 the feature requirement or setting 2302 the feature API. Next, the feature tag component 744 gets 2304 a list of active MNBs, and deactivates 2306 any active MBNs. Next, the feature tag component 744 sets 2308 previous MBNs to pending, and sets 2310 corresponding features' TLVs. If the feature tag component 744 determines 2312 the hardware MBN is pending, the process moves to operation 2318 to complete the Sub-system request (SSREQ), and operation 2320 where the feature processing is invoked during MBN activation. If the hardware MBN is not pending, the feature tag component 744 next determines 2314 if the refresh is enabled. If not, the process moves to operation 2318 as described above. If yes, the feature tag component 744 refreshes 2316 the software MBNs, and moves to operation 2320.

In a non-limiting example, auto-selection data may be available in feature tags, such as country specific data in XML. The country name in feature tag may be compared to country set by auto-selection. Table of IMSI/IIN information may be mapped to country as part of auto-selection implementation. In another non-limiting example, the auto-selection even may be initiated (e.g. when new sim card is inserted, roaming occurs . . . ). The auto-selection process sets country and carrier ID. The MBN is selected based on carrier ID. The refresh occurs on given subscription for selected MBN. The country specific settings processed by comparing country in feature tag with country set by auto-selection. Information in the feature tags may be cached for future selection.

Figure 24:
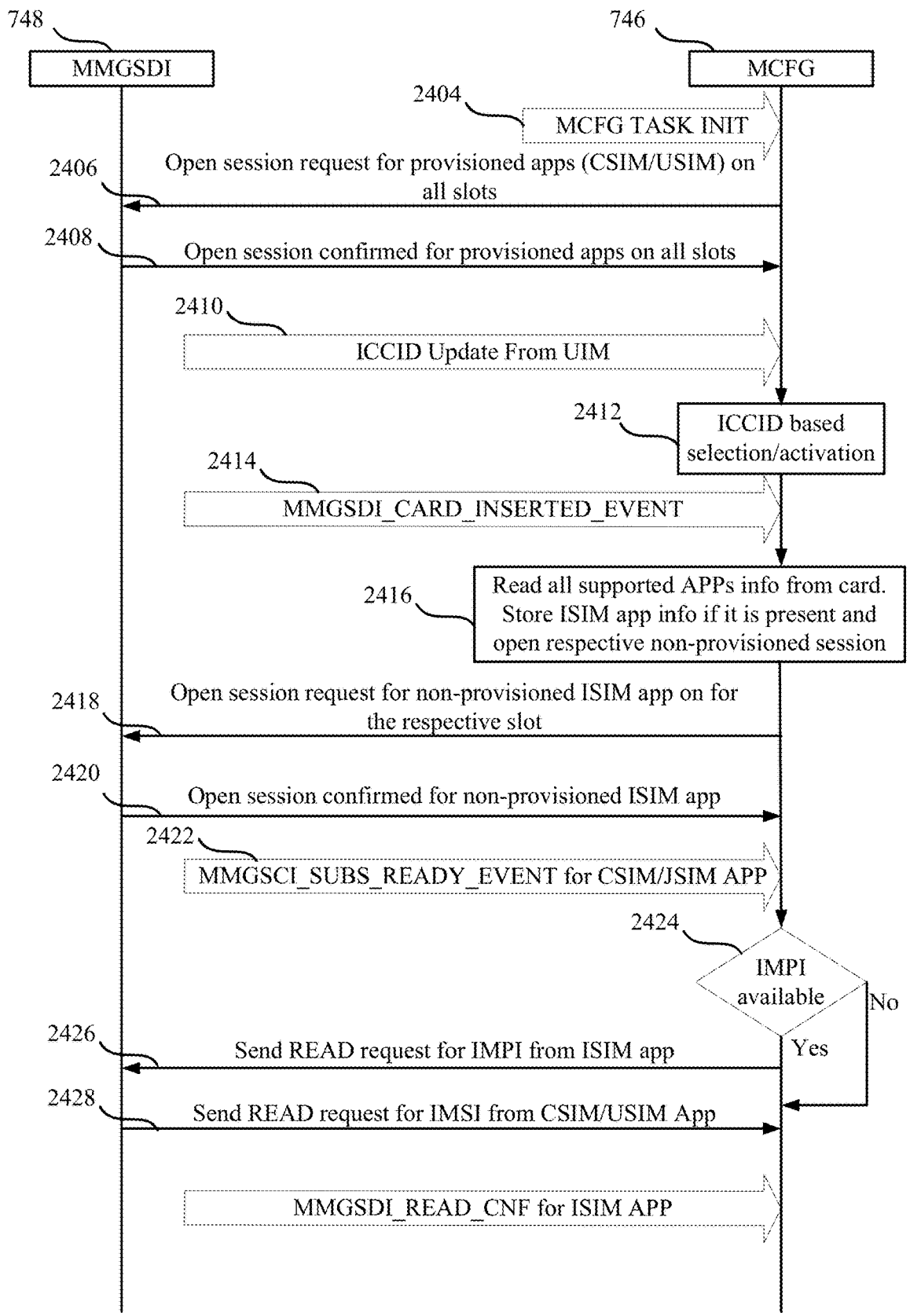
FIGS. 24-25 are example diagrams enhanced auto-selection using IMPI values.

Certain subscriber modules may not conform to the ITU standard, which may cause difficulties in auto-selection during roaming. In such case, the auto-selection component 742 may access the IMPI value from the SIM card because it will not change during roaming. This ensures that the MBN for the non-conforming cellular phone would be activated even during roaming. This process may be preprogrammed to activate for certain geographic locations or certain carriers. Turning now to FIG. 24, which illustrates the negotiation process for enhanced auto-selection between the MMGSDI sub-component 748 and the MCFG sub-component 746. Upon task initiation, the MCFG sub-component 746 opens 2406 session request for provisioned app (CSIM/USIM) on all slots, and the MMGSDI sub-component 748 opens 2408 session to confirm for provisioned apps on all slots. After the ICCID update 2410 from the UIM, the ICCID based section/activation is triggered 2412 and the MMGSDI_CARD_INSERTED_EVENT occurs 2414. The MCFG sub-component 746 reads 2416 all supported APPS information from card and stores ISIM app information if it is present and open. Next, the MCFG sub-component 746 opens 2418 session request for non-provisioned ISIM app for the respective slot, and the MMGSDI sub-component 748 opens 2420 session confirming for non-provisioned ISIM app. After the execution 2422 of the operation MMGSDI_SUBS_READY_EVENT for CSIM/JSIM app, the MCFG sub-component 746 determines 2424 if IMPI is available. If the IMPI is available, the MCFG sub-component 746 sends 2426 READ request for IMPI from ISIM APP. If not available, the MCFG sub-component 746 sends 2428 READ request for IMSI from CSIM/USIM APP.

Figure 25:
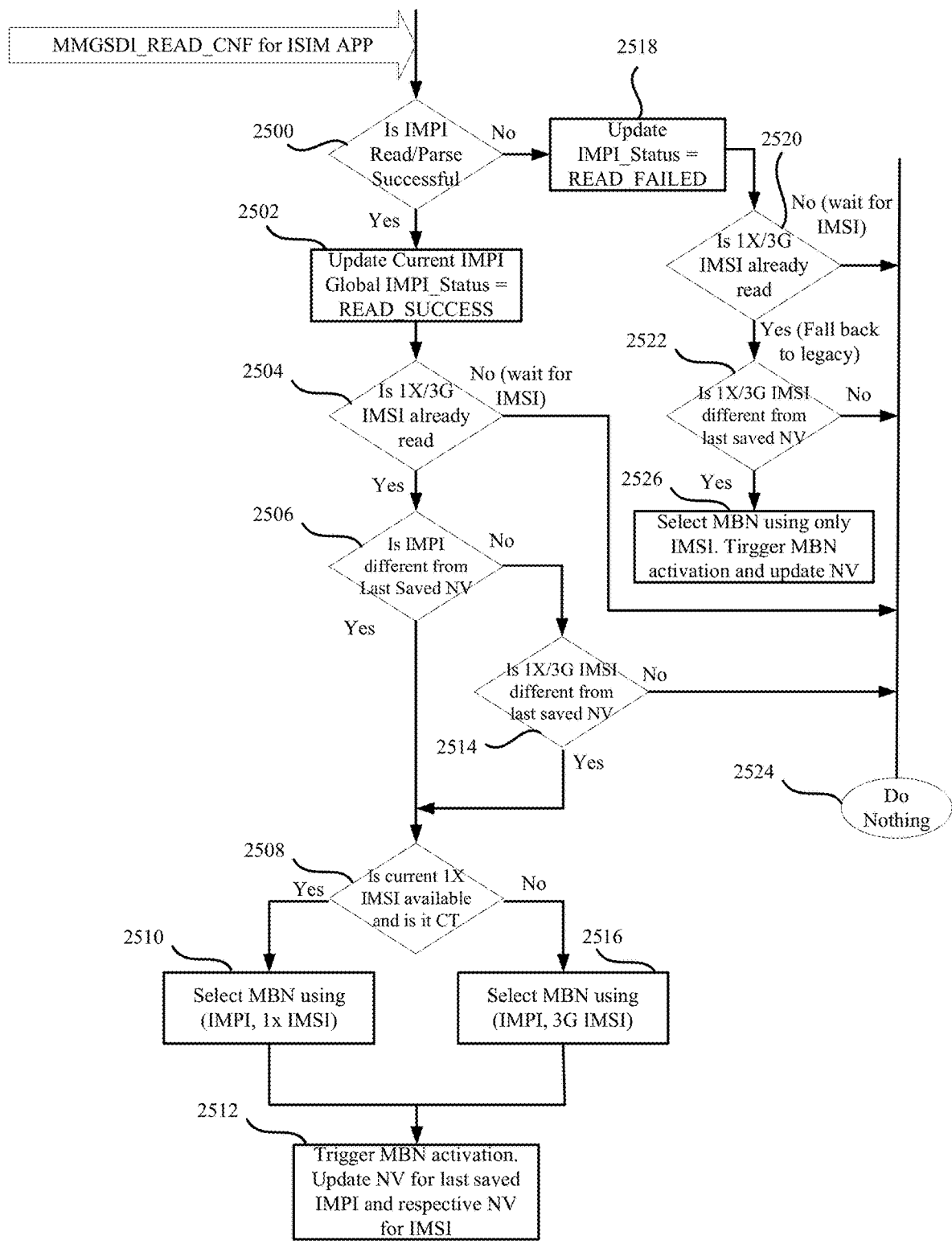

Referring now to FIG. 25, which illustrates the process of IMPI read. At block 2500, the MMGSDI sub-component 748 determines if IMPI read/parse is successful. If successful, the MMGSDI sub-component 748 updates 2502 current IMPI Global IMPI_status to equal READ_SUCCESS. Next, the MMGSDI sub-component 748 determines 2504 if 1×/3G IMSI already read. If not already read, the MMGSDI sub-component 748 does nothing 2524. If already read, the MMGSDI sub-component 748 determines 2506 if IMPI is different from the last saved NV. If yes, the MMGSDI sub-component 748 determines 2508 if the current 1×IMSI is available and if it is 1×IMSI 403/03. This decision leads the MMGSDI sub-component 748 to either select 2510 MBN using IMPI or 1×IMSI, or select 2516 MBN using IMPI or 3G IMSI. Next, the MMGSDI sub-component 748 triggers 2512 MBN activation and updates NV for last saved IMPI and respective NV for IMSI. At block 2506, if the MMGSDI sub-component 748 determines that the IMPI is not different from the last saved NV, the process moves to operation 2514 to determine if the 1×/3G IMSI is different from the last saved NV. If yes, the process moves to operation 2508 as described above. If no, the process moves to operation 2524 and does nothing.

Still referring to FIG. 25, if the IMPI read/parse is not successful at block 2500, the MMGSDI sub-component 748 updates 2518 the IMPI_Status register to the value of "READ_FAILED". Next, the MMGSDI sub-component 748 determines 2520 if 1×/3G IMSI already read. If not already read, the MMGSDI sub-component 748 waits for ISMI and does nothing 2524. If the 1×/3G ISMI is already read, the MMGSDI sub-component 748 fallbacks 2522 to legacy mode and either does nothing 2524 or selects 2526 MBN using only IMSI, triggers MBN activation, and updates respective NV.

Figure 26:
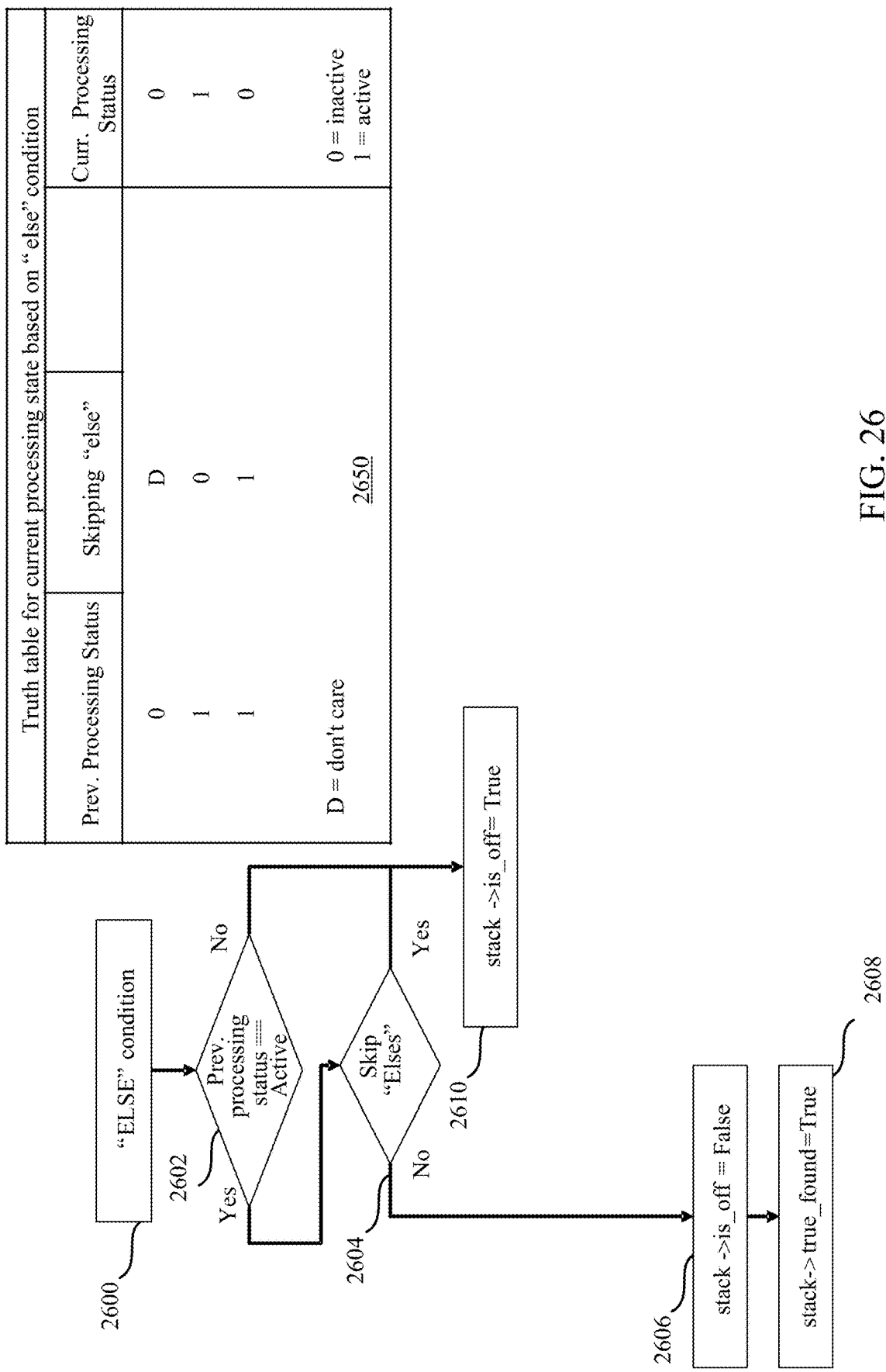
FIG. 26 is an example flow diagram illustrating an example of feature tag processing.

During the feature stack update under the "ELSE" condition, as shown in FIG. 26, the feature tag component 744 may apply the mcfg_feat_stack_update( ) operation. Once the "else" condition is verified 2600, the feature tag component 744 determines 2602 if the previous processing status is active. If yes, the feature tag component 744 determines 2604 whether to skip the "else" clause. If no, the feature tag component 744 sets 2610 the stack->is_off value to true. If the feature tag component 744 determines 2604 to skip the "else" clause, the operation moves to 2610 as described above. If not skipping the "else" clause, the feature tag component 744 sets 2606 the stack-is_off value to false, and then sets 2608 the stack->true_found value to be true. The true_found is the flag used for skipping "elses". An example truth table 2650 illustrates the Boolean expressions for the current processing state based on the "if" condition.

Figure 27:
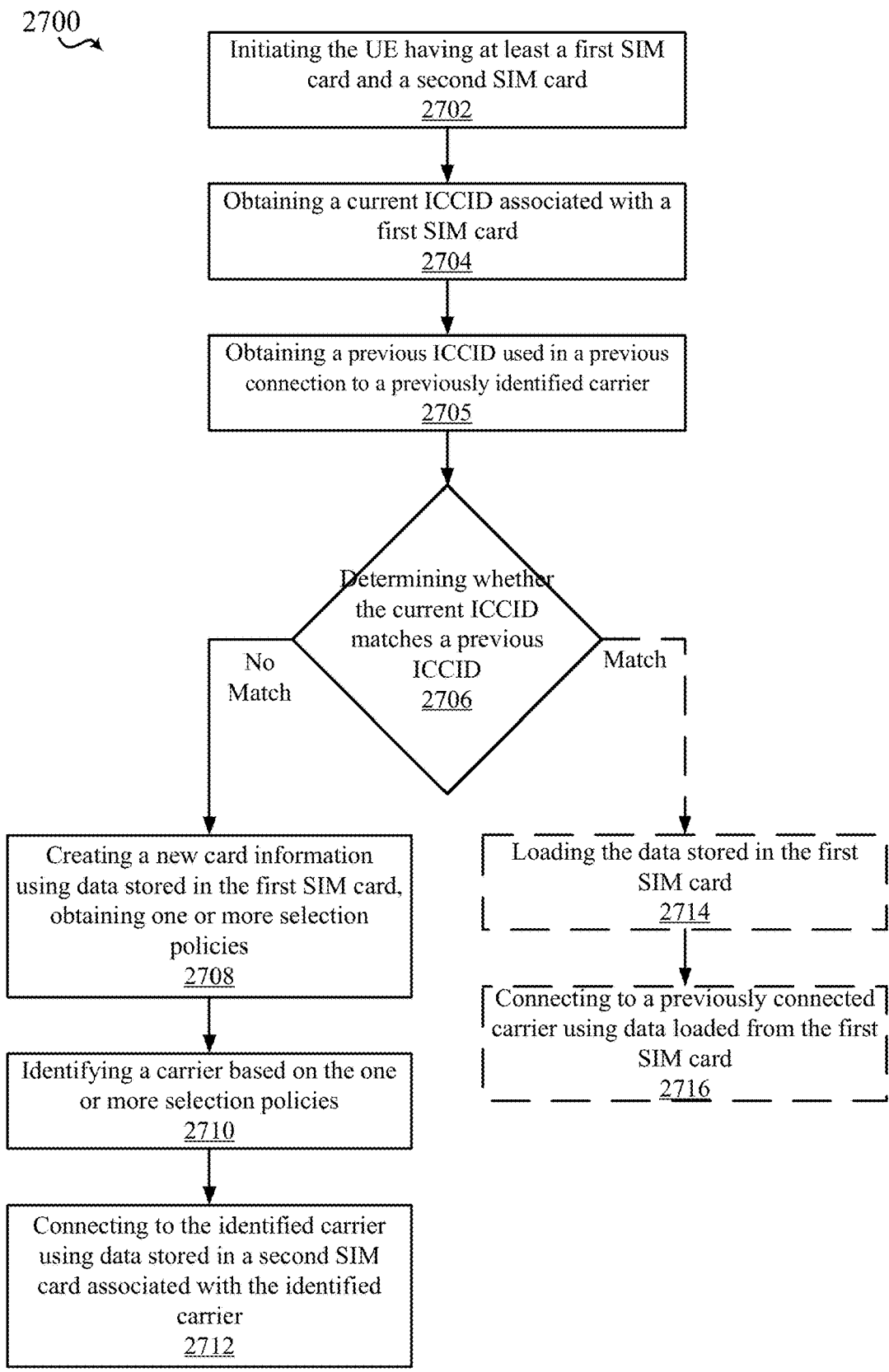
FIG. 27 is an example flow diagram illustrating another example of enhanced auto-selection.

Turning now to FIG. 27, in some implementations, a method 2700 of performing enhanced auto-selection in the UE 710 includes initiating 2702 the UE 710 having at least a first SIM card and a second SIM card. For example, the modem 740 processor 812 initiates the UE 710 having at least a first SIM card and a second SIM card.

Next, at block 2704, the method 2700 obtains a current ICCID associated with the first SIM card. For example, the auto-select component 742 obtains a current ICCID associated with the first SIM card.

Next, at block 2705, the method 2700 obtains, from a cache of the UE 710, a previous ICCID used in a previous connection to a previously identified carrier. For example, the auto-select component 742 obtains a previous ICCID used to connect to the last carrier.

At block 2706, the method 2700 determines whether the current ICCID matches the previous ICCID so the UE 710 is able to connect to the previously identified carrier. For example, the auto-select component 742 determines whether the current ICCID matches the previous ICCID so the UE 710 may connect to the last carrier without utilizing the auto-select process to choose a new carrier for connection. The auto-select component 742 may compare the current ICCID value to the previous ICCID value stored in a temporary or permanent storage of the UE 710, for example, the memory 816. If the current ICCID matches the previous ICCID, the UE 710 may connect, for example, to the last carrier without initiating the auto-select process. If, on the other hand, the current ICCID does not match the previous ICCID, the UE 710 proceeds to the auto-select process described below. Alternatively, the processing circuit 210 and/or the modem configurator 202 may perform the method 2700.

At block 2708, in response to determining that the current ICCID does not match the previous ICCID, the method 2700 creates a new card information using data stored in the first SIM card, obtaining one or more selection policies. For example, in response to the auto-select component 742 determining that the current ICCID does not match the previous ICCID, the auto-select component 742 creates a new card information using data stored in the first SIM card, obtaining one or more selection policies.

At block 2710, the method 2700 identifies a carrier based on the one or more selection policies. For example, the auto-select component 742 identifies a carrier based on the one or more selection policies.

At block 2712, the method 2700 connects to the identified carrier using data stored in the second SIM card associated with the identified carrier. For example, the auto-select component 742 connects to the identified carrier using data stored in the second SIM card associated with the identified carrier.

In certain implementations, the auto-select component 742 may optionally cache the data stored in the second SIM card to accelerate the execution of the algorithm for future selection of the best network by enhancing modem key performance parameters (KPI's) to access service. Similarly, the auto-select component 742 may optionally filter out certain undesirable features associated with the identified carrier.

In some implementations, the auto-select component 742 may optionally cache the modem configuration used to connect to the identified carrier.

In optional implementations, at block 2714, in response to determining that the current ICCID matches the previous ICCID, the method 2700 optionally loads the data stored in the first SIM card. For example, in response to the auto-select component 742 determining that the current ICCID matches the previous ICCID, the auto-select component 742 optionally loads the data stored in the first SIM card.

In optional implementations, at block 2716, the method 2700 optionally connects to a previously connected carrier using the data loaded from the first SIM card. For example, the auto-select component 742 may connect to a previously connected carrier using the data loaded from the first SIM card. By connecting to a previously connected carrier using the data from the first SIM card, the UE 710 may quick establish connections with the previously connected carrier.

Figure 28:
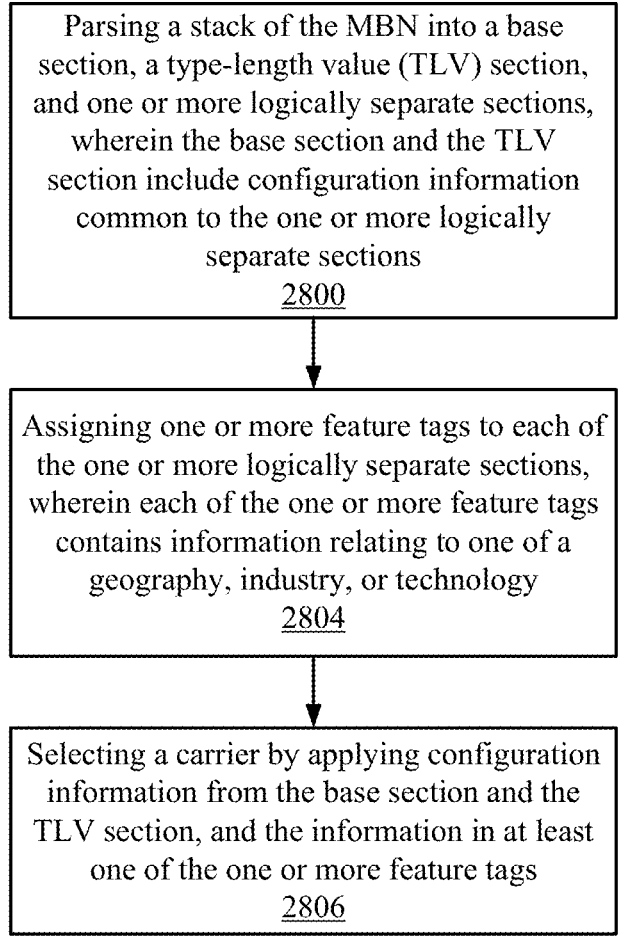
FIG. 28 is an example flow diagram illustrating an example of feature tag selection.

Turning now to FIG. 28, in some implementations, at block 2802, a method 2800 may parse a stack of the MBN into a base section, a TLV section, and one or more logically separate sections, wherein the base section and the TLV section include configuration information common to the one or more logically separate sections. For example, the feature tag component 744 may parse a stack of the MBN into a base section, a TLV section, and one or more logically separate sections.

Next, at block 2804, the method 2800 may assign one or more feature tags to each of the one or more logically separate sections, wherein each of the one or more feature tags contains information relating to one of a geography, industry, or technology. For example, the feature tag component 744 may assign one or more feature tags to each of the one or more logically separate sections, wherein each of the one or more feature tags contains information relating to one of a geography, industry, or technology.

Next, at block 2806, the method 2800 may select a carrier by applying configuration information from the base section and the TLV section, and the information in at least one of the one or more feature tags. For example, the feature tag component 744 may select a carrier by applying configuration information from the base section and the TLV section, and the information in at least one of the one or more feature tags.

While the above discussed aspects, arrangements, and embodiments are discussed with specific details and particularity, one or more of the components, steps, features and/or functions illustrated in any of FIGS. 1-27 may be rearranged and/or combined into a single component, step, feature or function or embodied in several components, steps, or functions. Additional elements, components, steps, and/or functions may also be added or not utilized without departing from the present disclosure. The apparatus, devices, and/or components illustrated in FIGS. 1, 2, 3, 7, and/or 8 may be configured to perform or employ one or more of the methods, features, parameters, and/or operations described in FIGS. 4, 5, 6, and/or 9-27. The algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm operations described in connection with the embodiments disclosed herein may be implemented as hardware, software, firmware, middleware, microcode, or any combination thereof. To clearly illustrate this interchangeability, various illustrative components, blocks, modules, circuits, and operations have been described above generally in terms of their functionality. Whether such functionality is implemented as hardware or software depends upon the particular application and design constraints imposed on the overall system.

The various features associated with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is determined by the literal language, and legal equivalents, of the claims which follow.

What is claimed is:

1. A method of performing enhanced auto-selection in a user equipment (UE), comprising:
    initiating the UE having at least a first subscription module and a second subscription module;
    obtaining a current identifier associated with the first subscription module;
    obtaining, from a cache of the UE, a previous identifier used in a previous connection to a previously identified carrier;
    determining whether the current identifier matches the previous identifier so the UE is able to connect to the previously identified carrier;
    in response to determining that the current identifier does not match the previous identifier, initiating an auto-select process for the UE to connect to a carrier by:
        creating new module information using data stored in the first subscription module;
        obtaining one or more selection policies;
        identifying a carrier based on the one or more selection policies; and
        connecting to the identified carrier using data stored in the second subscription module associated with the identified carrier.

2. The method of claim 1, wherein initiating the UE further includes a power up event or a subscription module initiation event, wherein the subscription module initiation event includes the UE detecting an initiation of the first subscription module.

3. The method of claim 1, wherein the data stored in the second subscription module includes at least one of a mobile country code, a mobile network code, a group identification number, an issuer identification number, an international mobile subscriber identity, a service provider number, or an international mobile subscriber private identity.

4. The method of claim 1, further comprises caching the data stored in the second subscription module in the cache.

5. The method of claim 1, further comprises filtering out at least one feature associated with the identified carrier.

6. The method of claim 1, wherein connecting to the identified carrier includes connecting to the identified carrier using the data stored in the first subscription module associated with the identified carrier instead of the data stored in the second subscription module.

7. The method of claim 1, further comprises connecting to the identified carrier using modem configuration information.

8. The method of claim 7, further comprises caching the modem configuration information.

9. The method of claim 1, further comprises:
    loading the data stored in the first subscription module in response to determining that the current identifier matches the previous identifier; and
    connecting to the previously identified carrier using the data loaded from the first subscription module.

10. A user equipment (UE) for performing enhanced auto-selection, comprising:
    a memory storing instructions;
    a transceiver; and
    a processor, coupled with the memory and the transceiver, configured to execute the instructions to:
        initiate the UE having at least a first subscription module and a second subscription module;
        obtain a current identifier associated with the first subscription module;
        obtain, from the memory of the UE, a previous identifier used in a previous connection to a previously identified carrier;
        determine whether the current identifier matches the previous identifier so the UE is able to connect to the previously identified carrier;
        in response to determining that the current identifier does not match the previous identifier, initiating an auto-selection process for the UE to connect to a carrier by:
            create new module information using data stored in the first subscription module;
            obtain one or more selection policies;
            identify a carrier based on the one or more selection policies; and
            connect, via the transceiver, to the identified carrier using data stored in the second subscription module associated with the identified carrier.

11. The UE of claim 10, wherein initiating the UE further includes a power up event or a subscription module initiation event, wherein the subscription module initiation event includes the UE detecting an initiation of the first subscription module.

12. The UE of claim 10, wherein the data stored in the second subscription module includes at least one of a mobile country code, a mobile network code, a group identification number, an issuer identification number, an international mobile subscriber identity, a service provider number, or an international mobile subscriber private identity.

13. The UE of claim 10, wherein the processor is further configured to execute the instructions to cache the data stored in the second subscription module into the memory.

14. The UE of claim 10, wherein the processor is further configured to execute the instructions to filter out at least one feature associated with the identified carrier.

15. The UE of claim 10, wherein connecting to the identified carrier includes connecting to the identified carrier using the data stored in the first subscription module associated with the identified carrier instead of the data stored in the second subscription module.

16. The UE of claim 10, wherein the processor is further configured to execute the instructions to connect, via the transceiver, to the identified carrier using modem configuration information.

17. The UE of claim 16, wherein the processor is further configured to execute the instructions to cache the modem configuration information into the memory.

18. The UE of claim 10, wherein the processor is further configured to execute the instructions to:
load the data stored in the first subscription module in response to determining that the current identifier matches the previous identifier; and
connect to the previously identified carrier using the data loaded from the first subscription module.

19. A non-transitory computer readable medium having instructions stored therein, wherein the instructions, when executed by one or more processors, cause the one or more processors to:
initiate a user equipment (UE) having at least a first subscription module and a second subscription module;
obtain a current identifier associated with the first subscription module;
obtain a previous identifier used in a previous connection to a previously identified carrier;
determine whether the current identifier matches the previous identifier so the UE is able to connect to the previously identified carrier;
in response to determining that the current identifier does not match the previous identifier, initiating an autoselection process for the UE to connect to a carrier by:
create new module information using data stored in the first subscription module;
obtain one or more selection policies;
identify a carrier based on the one or more selection policies; and
connect to the identified carrier using data stored in the second subscription module associated with the identified carrier.

20. The non-transitory computer readable medium of claim 19, wherein initiating the UE further includes a power up event or a subscription module initiation event, wherein the subscription module initiation event includes the UE detecting an initiation of the first subscription module.

21. The non-transitory computer readable medium of claim 19, wherein the data stored in the second subscription module includes at least one of a mobile country code, a mobile network code, a group identification number, an issuer identification number, an international mobile subscriber identity, a service provider number, or an international mobile subscriber private identity.

22. The non-transitory computer readable medium of claim 19, further includes instructions, when executed by the one or more processors, cause the one or more processors to cache the data stored in the second subscription module.

23. The non-transitory computer readable medium of claim 19, further includes instructions, when executed by the one or more processors, cause the one or more processors to filter out at least one feature associated with the identified carrier.

24. The non-transitory computer readable medium of claim 19, connecting to the identified carrier includes connecting to the identified carrier using the data stored in the first subscription module associated with the identified carrier instead of the data stored in the second subscription module.

25. The non-transitory computer readable medium of claim 19, further includes instructions, when executed by the one or more processors, cause the one or more processors to connect to the identified carrier using modem configuration information.

26. The non-transitory computer readable medium of claim 25, further includes instructions, when executed by the one or more processors, cause the one or more processors to cache the modem configuration information.

27. The non-transitory computer readable medium of claim 19, further includes instructions, when executed by the one or more processors, cause the one or more processors to:
load the data stored in the first subscription module in response to determining that the current identifier matches the previous identifier; and
connect to the previously identified carrier using the data loaded from the first subscription module.

* * * * *